US010110286B2

United States Patent
Onggosanusi et al.

(10) Patent No.: US 10,110,286 B2
(45) Date of Patent: Oct. 23, 2018

(54) METHOD AND APPARATUS FOR CODEBOOK DESIGN AND SIGNALING

(71) Applicant: Samsung Electronics Co., Ltd, Suwon-si (KR)

(72) Inventors: Eko Onggosanusi, Mountain View, CA (US); Md. Saifur Rahman, Mountain View, CA (US); Boon Loong Ng, Mountain View, CA (US); Young-Han Nam, Mountain View, CA (US); Hyoungju Ji, Mountain View, CA (US); Hoondong Noh, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/080,304

(22) Filed: Mar. 24, 2016

(65) Prior Publication Data
US 2016/0294454 A1    Oct. 6, 2016

Related U.S. Application Data

(60) Provisional application No. 62/140,209, filed on Mar. 30, 2015, provisional application No. 62/146,092,
(Continued)

(51) Int. Cl.
*H04B 7/04* (2017.01)
*H04B 7/06* (2006.01)
*H04B 7/0456* (2017.01)

(52) U.S. Cl.
CPC ......... *H04B 7/0456* (2013.01); *H04B 7/0478* (2013.01); *H04B 7/0482* (2013.01); *H04B 7/065* (2013.01); *H04B 7/0626* (2013.01)

(58) Field of Classification Search
CPC .. H04B 7/0417; H04B 7/0452; H04B 7/0456; H04B 7/0478; H04B 7/0626; H04B 7/0639; H04L 1/0079
See application file for complete search history.

(56) References Cited

U.S. PATENT DOCUMENTS

| 2012/0039298 A1* | 2/2012 | Lee | H04L 5/0051 370/330 |
|---|---|---|---|
| 2013/0258964 A1 | 10/2013 | Nam et al. | |

(Continued)

OTHER PUBLICATIONS

R1-151926, "2D codebook with KP structure and associated feedback", Ericsson, 3GPP, Serbia, Apr. 20-24, 2015.*
(Continued)

*Primary Examiner* — Aristocratis Fotakis

(57) ABSTRACT

Methods and apparatuses for codebook design and signaling are provided. A user equipment (UE) apparatus for codebook design and signaling includes a processor and a transceiver operably connected to the processor. The transceiver is configured to receive configuration information for a channel state information (CSI) process, receive configuration information for a CSI reference signal (CSI-RS) resource; receive configuration information for a MIMO type; and receive a plurality of codebook parameters when the MIMO type is non-precoded. A base station (BS) apparatus for codebook design and signaling includes a transceiver and a processor operably connected to the transceiver. The processor is configured to configure a UE with a CSI process and a CSI-RS resource, configure the UE with a MIMO type, and cause the transceiver to transmit configuration information for the CSI process, the CSI-RS resource, and the MIMO type to the UE.

15 Claims, 12 Drawing Sheets

Related U.S. Application Data filed on Apr. 10, 2015, provisional application No. 62/154,542, filed on Apr. 29, 2015, provisional application No. 62/195,589, filed on Jul. 22, 2015, provisional application No. 62/197,936, filed on Jul. 28, 2015, provisional application No. 62/199,659, filed on Jul. 31, 2015, provisional application No. 62/202,669, filed on Aug. 7, 2015, provisional application No. 62/206,506, filed on Aug. 18, 2015, provisional application No. 62/216,633, filed on Sep. 10, 2015, provisional application No. 62/234,740, filed on Sep. 30, 2015, provisional application No. 62/238,738, filed on Oct. 8, 2015, provisional application No. 62/289,597, filed on Feb. 1, 2016, provisional application No. 62/291,284, filed on Feb. 4, 2016.

(56) References Cited

U.S. PATENT DOCUMENTS

| | | | |
|---|---|---|---|
| 2013/0258965 | A1 | 10/2013 | Geirhofer et al. |
| 2014/0098689 | A1* | 4/2014 | Lee ............ H04B 7/0469 370/252 |
| 2014/0169415 | A1 | 6/2014 | Werner et al. |
| 2014/0177745 | A1* | 6/2014 | Krishnamurthy .... H04B 7/0413 375/267 |
| 2014/0328422 | A1* | 11/2014 | Chen ............ H04B 7/0486 375/267 |
| 2015/0003271 | A1* | 1/2015 | Park ............ H04L 27/2613 370/252 |
| 2015/0139112 | A1* | 5/2015 | Park ............ H04B 7/0413 370/329 |
| 2016/0233938 | A1* | 8/2016 | Mondal ............ H04B 17/345 |
| 2016/0359538 | A1* | 12/2016 | Onggosanusi ....... H04B 7/0469 |
| 2017/0047978 | A1* | 2/2017 | Kim ............ H04B 7/0626 |
| 2017/0048037 | A1* | 2/2017 | Yen ............ H04B 7/0695 |

OTHER PUBLICATIONS

R1-151412, Discussion on non-precoded CSI-RS and feedback enhancements, 3GPP TSG-RAN WG1 #80bis, Qualcomm Incorporated, Serbia, Apr. 20-24, 2015.*
R1-152979, Discussion on New Codebook Design for EBF/FD-MIMO System, 3GPP TSG RAN WG1 Meeting #81, ZTE, Japan, May 25-29, 2015.*
3GPP TS 36.211 V12.4.0 (Dec. 2014) 3rd Generation Partnership Project; Technical Specification Group Radio Access Network; E-UTRA; Physical channels and modulation; (Release 12), 124 pgs.
3GPP TS 36.212 V12.3.0 (Dec. 2014) 3rd Generation Partnership Project; Technical Specification Group Radio Access Network; E-UTRA; Multiplexing and channel coding (Release 12), 89 pgs.
3GPP TS 36.213 V12.4.0 (Dec. 2014) 3rd Generation Partnership Project; Technical Specification Group Radio Access Network; E-UTRA, Physical layer procedures (Release 12), 225 pgs.
3GPP TS 36.331 V12.4.0 (Dec. 2014) 3rd Generation Partnership Project; Technical Specification Group Radio Access Network; E-UTRA; Radio Resource Control (RRC); Protocol specification (Release 12), 410 pgs.
International Search Report dated Jul. 8, 2016 in connection with International Application No. PCT/KR2016/003170, 3 pages.
Written Opinion of the International Searching Authority dated Jul. 8, 2016 in connection with International Application No. PCT/KR2016/003170, 5 pages.
Samsung et al., "WF on PMI Feedback Scenarios for EBF/FD-MIMO", R1-150817, 3GPP TSG RAN WG1 Meeting #80, Athens, Greece, Feb. 9-13, 2015, 5 pages.
Supplementary European Search Report dated Mar. 22, 2018 in connection with European Patent Application No. 16 77 3404.
Samsung et al., "WF on CSI process for PMI based Rel.13 FD-MIMO", 3GPP TSG-RAN WG1 #82, Aug. 24-28, 2015, 2 pages, R1-154781.
AT&T et al., "WF on class A and class B CSI reporting for Rel.13 EB/FD-MIMO", 3GPP TSG RAN WG1 Meeting #82bis, Oct. 5-9, 2015, 10 pages, R1-156217.

* cited by examiner

METHOD AND APPARATUS FOR CODEBOOK DESIGN AND SIGNALING

CROSS-REFERENCE TO RELATED APPLICATIONS AND CLAIM OF PRIORITY

This application claims priority under 35 U.S.C. § 119(e) to:
U.S. Provisional Patent Application No. 62/140,209 filed Mar. 30, 2015;
U.S. Provisional Patent Application No. 62/146,092 filed Apr. 10, 2015;
U.S. Provisional Patent Application No. 62/154,542 filed Apr. 29, 2015;
U.S. Provisional Patent Application No. 62/195,589 filed Jul. 22, 2015;
U.S. Provisional Patent Application No. 62/197,936 filed Jul. 28, 2015;
U.S. Provisional Patent Application No. 62/199,659 filed Jul. 31, 2015;
U.S. Provisional Patent Application No. 62/202,669 filed Aug. 7, 2015;
U.S. Provisional Patent Application No. 62/206,506 filed Aug. 18, 2015;
U.S. Provisional Patent Application No. 62/216,633 filed Sep. 10, 2015;
U.S. Provisional Patent Application No. 62/234,740 filed Sep. 30, 2015;
U.S. Provisional Patent Application No. 62/238,738 filed Oct. 8, 2015;
U.S. Provisional Patent Application No. 62/289,597 filed Feb. 1, 2016; and
U.S. Provisional Patent Application No. 62/291,284 filed Feb. 4, 2016.
The above-identified provisional patent applications are hereby incorporated by reference in their entirety.

TECHNICAL FIELD

The present disclosure relates generally to codebook design and its associated signaling for multiple transmit antennas. Such two dimensional arrays can be associated with a type of multiple-input multiple-output (MIMO) system often termed "full-dimension" MIMO (FD-MIMO) or massive MIMO or 3D-MIMO.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for codebook design and signaling.

In one embodiment, a user equipment (UE) is provided. The UE includes a processor and a transceiver operably connected to the processor. The transceiver is configured to receive configuration information for a channel state information (CSI) process, receive configuration information for a CSI reference signal (CSI-RS) resource; receive configuration information for a MIMO type; and receive a plurality of codebook parameters when the MIMO type is non-precoded.

In another embodiment, a base station (BS) is provided. The BS includes a transceiver and a processor operably connected to the transceiver. The processor is configured to configure a UE with a CSI process and a CSI-RS resource, configure the UE with a MIMO type, and cause the transceiver to transmit configuration information for the CSI process, the CSI-RS resource, and the MIMO type to the UE. The UE is configured with a plurality of codebook parameters when the MIMO type is non-precoded.

In another embodiment, a method for operating a UE is provided. The method includes receiving configuration information for a CSI process, receiving configuration information for a CSI-RS resource, receiving configuration information for a MIMO type, and receiving a plurality of codebook parameters when the MIMO type is non-precoded.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNodeB"
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); and 3GPP TS 36.331 version 12.4.0, "E-UTRA, Radio Resource Control (RRC) Protocol Specification" ("REF 4").

Figure 1:
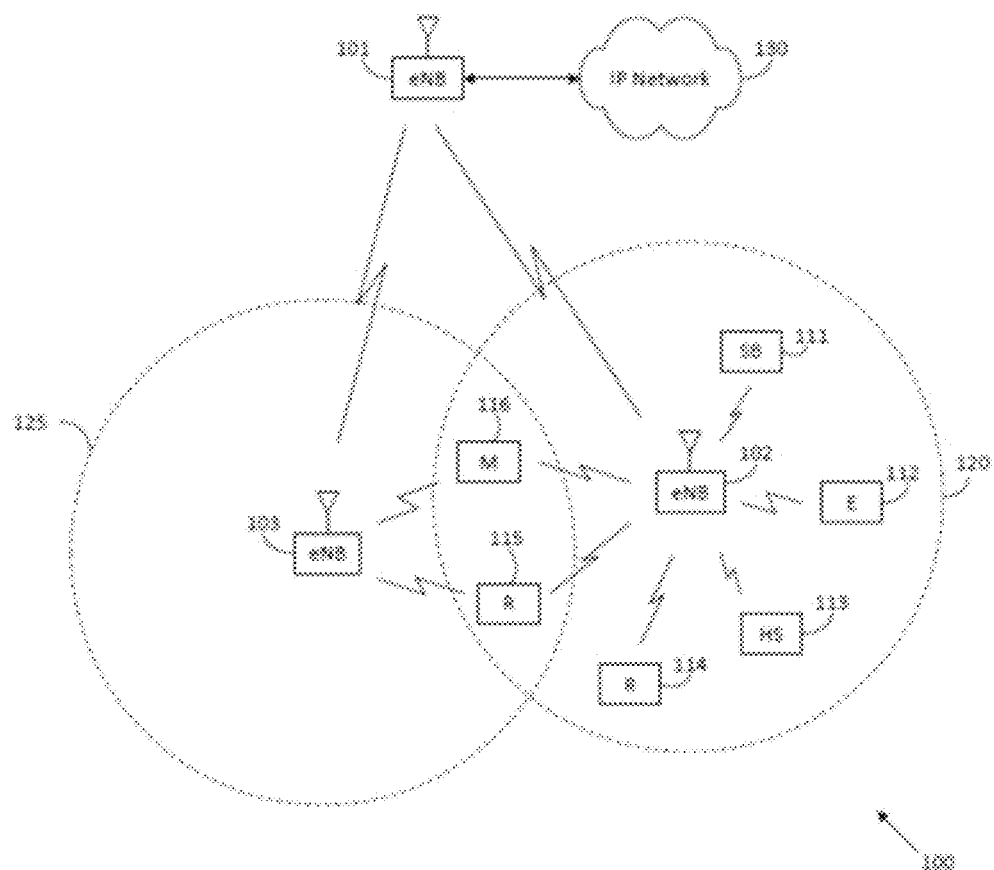
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure. The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Depending on the network type, other well-known terms can be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which may be located in a WiFi hotspot (HS); a UE 114, which can be located in a first residence (R); a UE 115, which may be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support channel quality measurement and reporting for systems having 2D antenna arrays. In various embodiments, one or more of BSs 101-103 and UEs 111-116 perform signaling for a designed codebook.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
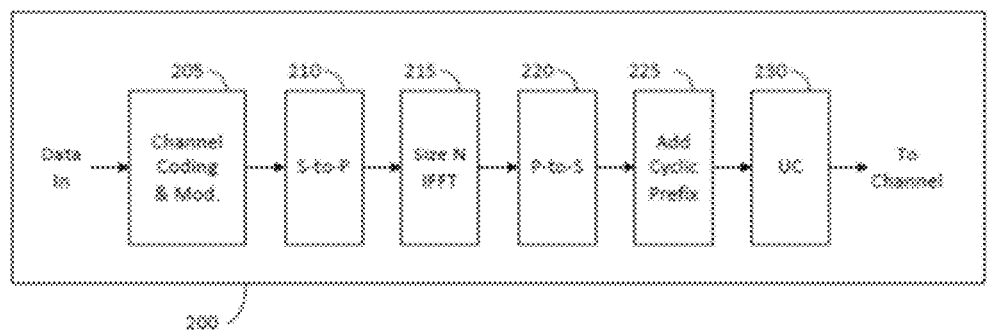
FIGS. 2A and 2B illustrate example wireless transmit and receive paths according to various embodiments of the present disclosure.
Figure 2B:
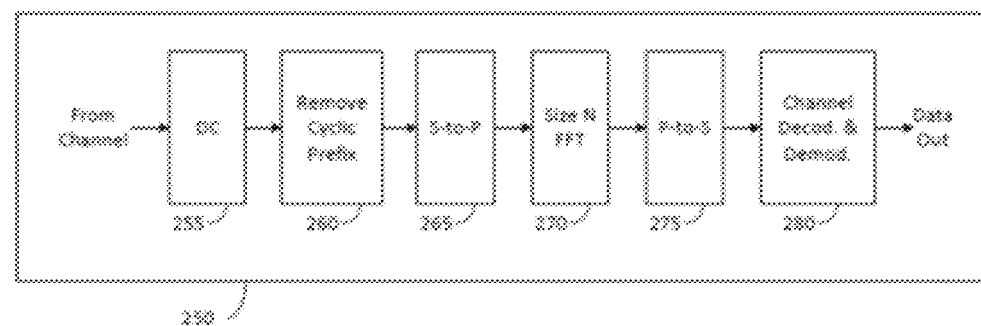

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to support channel quality measurement and reporting for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for a designed codebook. Each of the eNBs 101-103 may implement a transmit path 200 that is analogous to transmitting in the downlink to UEs 111-116 and can implement a receive path 250 that is analogous to receiving in the uplink from UEs 111-116. Similarly, each of UEs 111-116 may implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
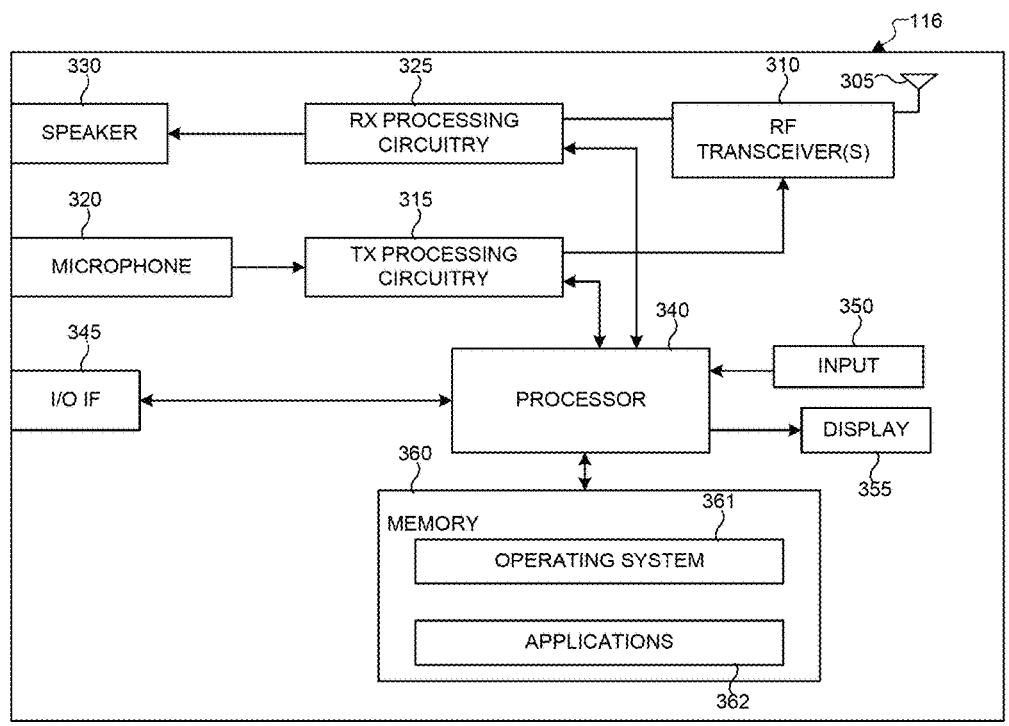
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the main controller 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, the UE 116 can perform signaling for a designed codebook. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
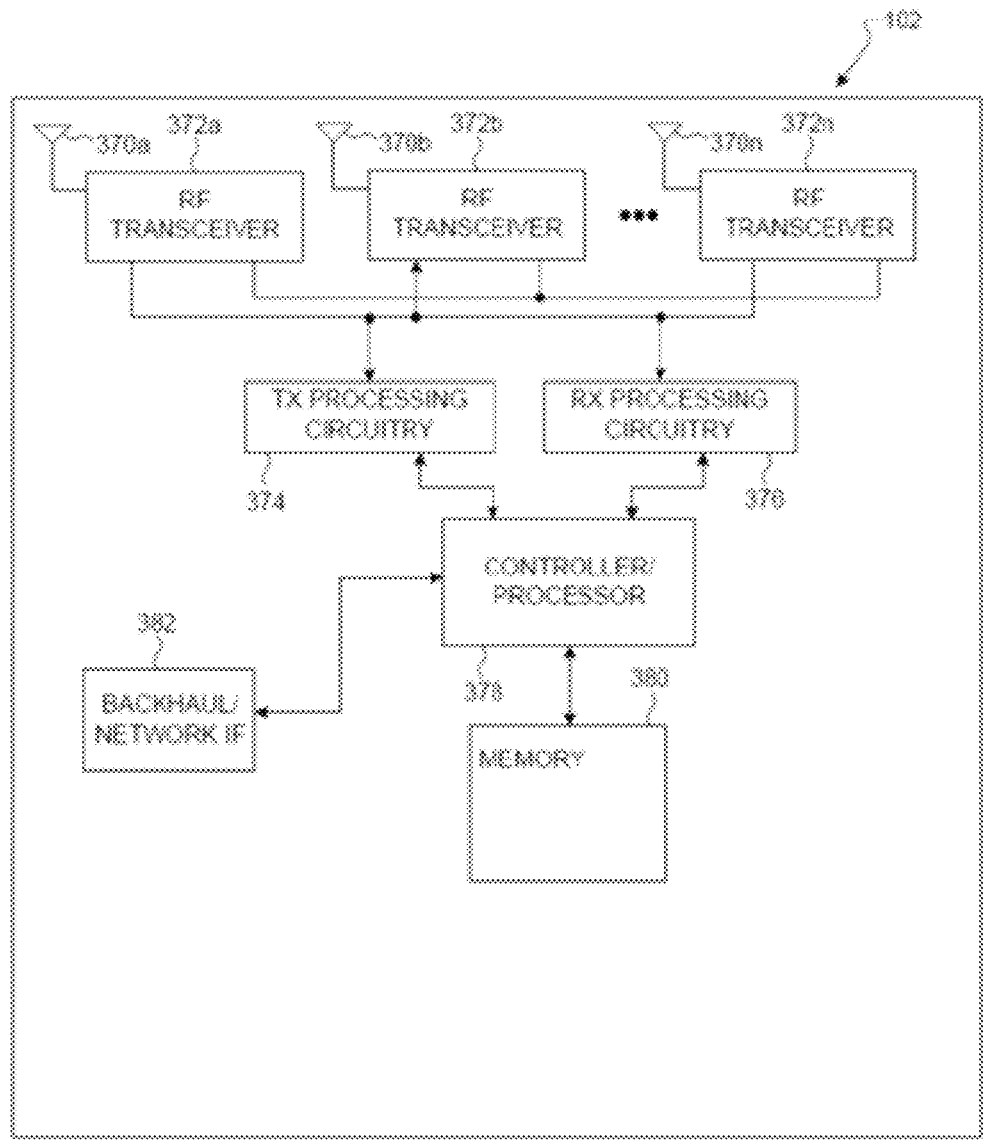
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform signaling for a designed codebook and can support communication with aggregation of FDD cells and TDD cells.

Although FIG. 3B illustrates one example of an eNB 102, various changes can be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
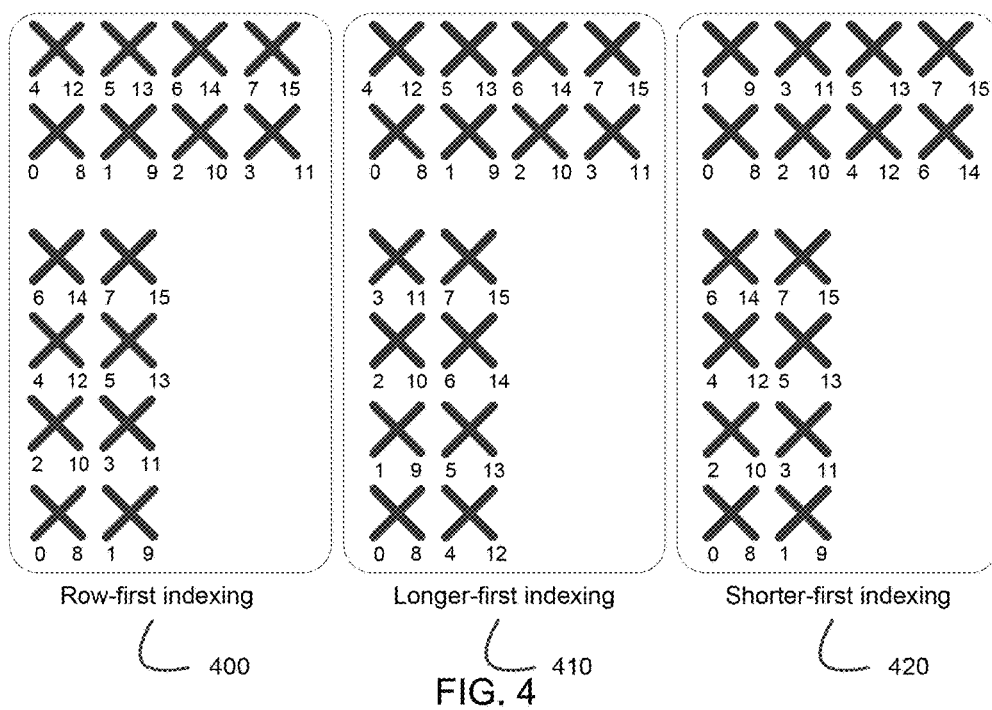
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 depicts an example of a 2D dual-polarized antenna port array with $M_a$ rows and $N_a$ columns where $(M_a, N_a)=(2, 4)$ and $(4, 2)$ which can be utilized in one or more embodiments of the present disclosure. These arrangement results in a total of $2M_aN_a=16$ ports, each mapped to one CSI-RS port. The three indexings 400, 410, and 420 are three examples in indexing the 16 antenna ports as a means of mapping antenna ports to precoding matrix elements. For row-first indexing 400, antenna ports associated with the same polarization group are indexed in a row-first manner regardless of $(M_a, N_a)$. For longer-first indexing 410, antenna ports associated with the same polarization group are indexed in a column-first manner when $M_a>N_a$, but row-first manner when $M_a \leq N_a$. For shorter-first indexing 430, antenna ports associated with the same polarization group are indexed in a row-first manner when $M_a>N_a$, but column-first manner when $M_a \leq N_a$. Indexing 400 is therefore termed row-first indexing while indexing 410 longer-first indexing and indexing 420 shorter-first indexing.

In these illustrative embodiments, both $M_a$ and $N_a$ can be configured by an eNodeB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

Designing a CSI reporting mechanism which attains high accuracy with a reasonably low feedback overhead is challenging as more antenna ports are utilized. Especially relevant is an ability to adapt to long-term channel statistics including DL AoD profile. Unlike short-term channel coefficients, under certain circumstances it is possible to measure long-term channel statistics at an eNodeB even for FDD. Provided that UL-DL duplex distance is not too large, UL-DL long-term reciprocity holds and allows an eNodeB to measure DL AoD profile from uplink signals. If, for some reason, such a measurement scheme is infeasible, a low-rate CSI reporting which contains an indication of DL AoD profile can be employed. Therefore, there is a need to design codebooks for CSI reporting and its associated reporting procedures, which slowly adapts to long-term channel statistics while maintaining low feedback overhead.

A precoding matrix or a precoder, which can be used by an eNodeB (such as 102) to perform short-term precoding for transmitting to a UE and assumed by a UE to derive a CSI report, can be described as a dual-stage precoding matrix:

$$W = W_1 W_2 \quad \text{(Equation 1)}$$

Referring to FIG. 4, the size of the precoding matrix W is $N_{TX} \times N_L$ where $N_{TX} = 2M_a N_a$ is the total number of antenna or CSI-RS ports and $N_L$ is the number of transmission layers (also termed the rank). The first-stage precoder $W_1$ pertains to a long-term component and is associated with long-term channel statistics. The second-stage precoder $W_2$ pertains to a short-term component which performs selection, co-phasing, or any linear operation to $W_1$. Therefore, the number of columns of $W_1$ can be perceived as the number of basis vectors $N_b$ for $W_2$.

For 2D rectangular port array, each of the first and the second stage precoders can be described as a Kronecker product of a first and a second precoder. In the present disclosure, A⊗B denotes the Kronecker product between two matrices A and B. This example embodiment is termed the full Kronecker Product (full KP) codebook. The subscripts m and n in $W_{m,n}(i_{m,n})$ denote precoding stage (first or second) and dimension (first or second, such as vertical or horizontal), respectively. Each of the precoders $W_{m,n}$ is a function of an index which serves as a PMI component. Thus, the precoding matrix W can be described in terms of 4 PMI components $i_{1,1}, i_{1,2}, i_{2,1}, i_{2,2}$ as follows.

$$W(i_{1,1}, i_{1,2}, i_{2,1}, i_{2,2}) = (W_{1,1}(i_{1,1}) W_{2,1}(i_{2,1})) \otimes (W_{1,2}(i_{1,2}) W_{2,2}(i_{2,2})) = (W_{1,1}(i_{1,1}) \otimes W_{1,2}(i_{1,2}))(W_{2,1}(i_{2,1}) \otimes W_{2,2}(i_{2,2})) \quad \text{(Equation 2)}$$

Given a precoding codebook (a set of precoding matrices $W(i_{1,1}, i_{1,2}, i_{2,1}, i_{2,2})$), a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNodeB 102. This PMI represents an index of a recommended precoding matrix in the precoding codebook. Different precoding codebooks can be used for different values of RI.

Another example embodiment assumes that a precoder in a designated codebook can be described in (3), termed the partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ is a function of an index which serves as a PMI component. Thus, the precoding matrix W can be described as a function of 3 PMI components $i_{1,1}, i_{1,2}, i_2$ as follows.

$$W(i_{1,1}, i_{1,2}, i_2) = (W_{1,1}(i_{1,1}) \otimes W_{1,2}(i_{1,2}))(W_2(i_2)) \quad \text{(Equation 3)}$$

Similar to the previous codebook embodiment, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNodeB 102.

In either of the above two embodiments, the number of columns of $W_{1,1}$ and $W_{1,2}$ can be perceived as the number of basis vectors, or the number of spatial beams associated with a first and a second dimensions, $N_{b,1}$ and $N_{b,2}$ for the second-stage precoder(s). To adapt to changes in long-term channel statistics such as AoD profiles, these two parameters can be configurable for a UE. Changing the values of $N_{b,1}$ and $N_{b,2}$ amounts to reconfiguring the codebook for the UE.

Configuring these parameters can also be done implicitly, such as by configuring a codebook selection parameter which corresponds to at least one of these two codebook parameters.

Figure 5A:
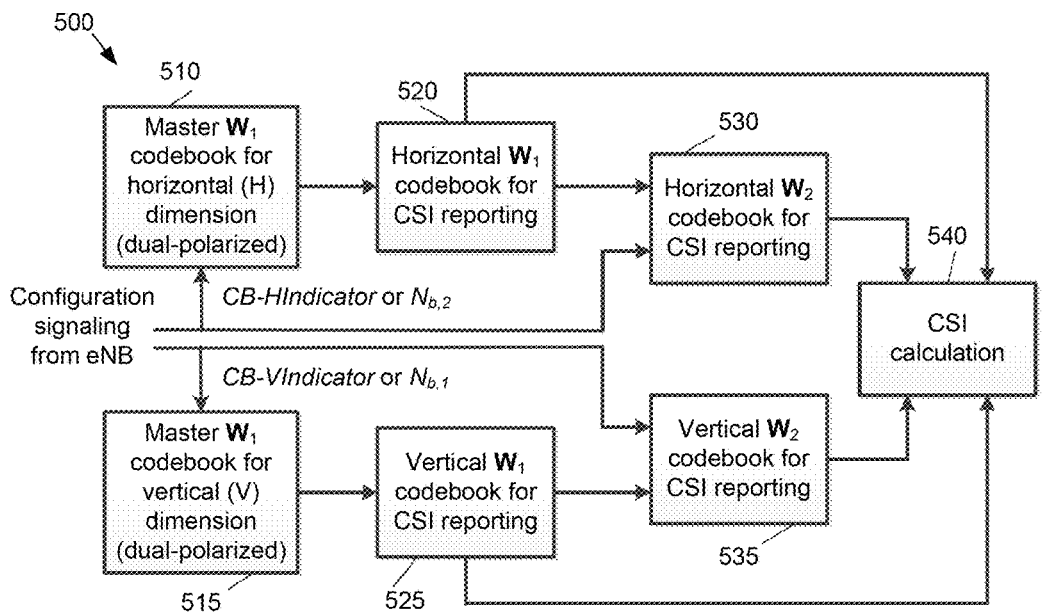
FIGS. 5A and 5B illustrate two example CSI calculation procedures based on adjustable 2D codebooks according to various embodiments of the present disclosure.

FIG. 5A illustrates an example CSI calculation method 500 based on a full KP codebook in accordance with an illustrative embodiment. The depiction of method 500 is for illustrative purposes; other embodiments of the method 500 could be used without departing from the scope of the present disclosure. For illustrative purposes, the first and the second dimensions are associated with vertical and horizontal, respectively. In method 500, a UE (e.g., one of UEs 111-116) receives a codebook configuration from a serving eNB (e.g., one of eNBs 101-103) which includes, among other parameters, vertical and horizontal codebook indicators $N_{b,1}$ and $N_{b,2}$. As aforementioned, one codebook selection parameter can be used in another example. Based on this configuration message, the UE selects or derives the first-stage codebooks associated with vertical and horizontal dimensions. For each dimension, a collection of codebooks for different configurations is termed a master codebook (510 and 515) from which the UE selects or derives the codebooks (520 and 525) for CSI calculation. Similarly, the second-stage codebooks 530 and 535 are determined based on the received codebook configuration message. The four codebooks 520, 525, 530, and 535 are assumed by the UE for CSI (e.g., CQI, PMI, and RI) calculation 540.

Figure 5B:
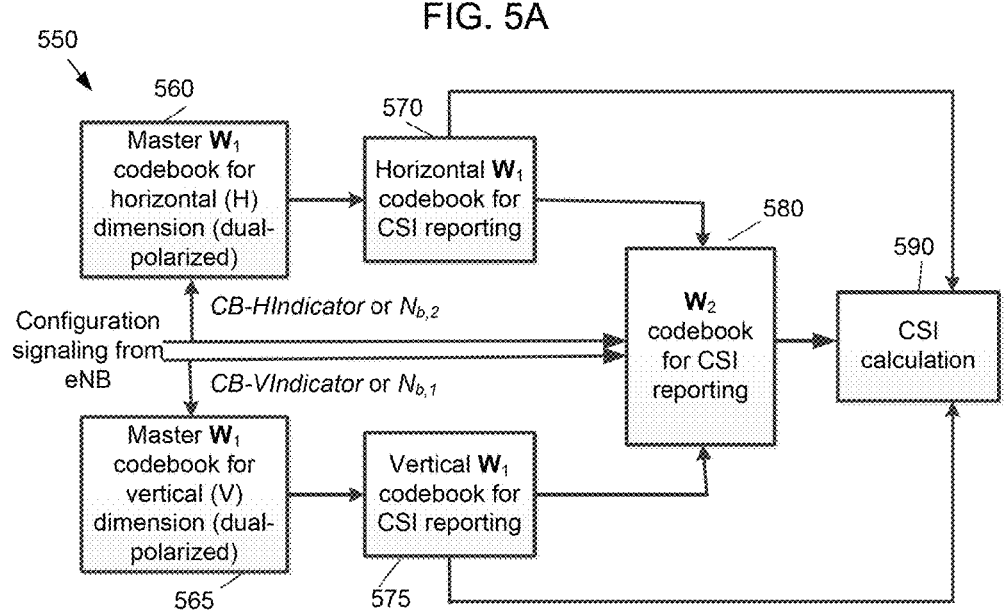

Similarly, FIG. 5B illustrates an example CSI calculation method 550 based on the partial KP codebook. The depiction of method 550 is for illustrative purposes; other embodiments of the method 550 could be used without departing from the scope of the present disclosure. In method 550, a UE (e.g., one of UEs 111-116) receives a codebook configuration from a serving eNB (e.g., one of eNBs 101-103) which includes, among other parameters, vertical and horizontal codebook indicators $N_{b,1}$ and $N_{b,2}$. As aforementioned, one codebook selection parameter can be used in another example. Based on this configuration message, the UE selects or derives the first-stage codebooks associated with vertical and horizontal dimensions. For each dimension, a collection of codebooks for different configurations is termed a master codebook (560 and 565) from which the UE selects or derives the codebooks (570 and 575) for CSI calculation. Likewise, the second-stage codebook 580 is determined based on the received codebook configuration message. The three codebooks 570, 575, and 580 is assumed by the UE for CSI (that is, CQI, PMI, and RI) calculation 590.

In the following description, several example codebook embodiments are disclosed. These codebook embodiments are first shown for each dimension and each stage before the resulting composite codebooks are disclosed.

A first-stage precoder codebook for a first dimension $W_{1,1}(i_{1,1})$ can be described for a uniform length-$M_a$ linear array in Equation 4 below. Each of the precoders in this codebook can be described as a length-$M_a$ discrete Fourier Transform (DFT) vector. Here $W_{1,1}(i_{1,1})$ is an $M_a \times N_{b,1}$ matrix which includes a set of $N_{b,1}$ beams. A set of indices $\{I_0(i_{1,1}), I_1(i_{1,1}), \ldots, I_{N_{b,1}-1}(i_{1,1})\}$ which depends on a precoder index $i_{1,1}$ is utilized to parameterize the beams/precoders. The integer parameter $O_1$ denotes the amount of oversampling on the phase domain for the first dimension. This parameter can be made configurable for a UE just as other codebooks parameters.

$$W_{1,1}(i_{1,1}) = \frac{1}{\sqrt{M_a}} \times \begin{bmatrix} v_{I_0(i_{1,1})} & v_{I_1(i_{1,1})} & \cdots & v_{I_{N_{b,1}-1}(i_{1,1})} \end{bmatrix}, \quad \text{(Equation 4)}$$

$$v_m = \begin{bmatrix} 1 & e^{j\frac{2\pi m}{O_1 M_a}} & e^{j\frac{4\pi m}{O_1 M_a}} & \cdots & e^{j\frac{2\pi(M_a-1)m}{O_1 M_a}} \end{bmatrix}^T$$

Based on (4), an example collection of codebooks $\Sigma_1 \cup \Sigma_2 \cup \Sigma_4 \cup \Sigma_8$ with different values of $N_{b,1}$ for $M_a=4$ and $O_1=8$ can be described as follows:

$\Sigma_1$ for $N_{b,1}=1$: $I_\Delta(i_{1,1})=2i_{1,1}$; $i_{1,1}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

$\Sigma_2$ for $N_{b,1}=2$: $I_\Delta(i_{1,1})=2i_{1,1}+\Delta$, $\Delta=0, 1$; $i_{1,1}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

$\Sigma_4$ for $N_{b,1}=4$: $I_\Delta(i_{1,1})=2i_{1,1}+\Delta$, $\Delta=0, 1, 2, 3$; $i_{1,1}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

$\Sigma_8$ for $N_{b,1}=8$: $I_\Delta(i_{1,1})=2i_{1,1}+\Delta$, $\Delta=0, 1, 2, \ldots, 7$; $i_{1,1}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

Another example collection of codebooks $\Sigma_1 \cup \Sigma_2 \cup \Sigma_4 \cup \Sigma_8$ with different values of $N_{b,1}$ for $M_a=4$ and $O_1=4$ can be described as follows:

$\Sigma_1$ for $N_{b,1}=1$: $I_\Delta(i_{1,1})=2i_{1,1}$; $i_{1,1}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$\Sigma_2$ for $N_{b,1}=2$: $I_\Delta(i_{1,1})=2i_{1,1}+\Delta$, $\Delta=0, 1$; $i_{1,1}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$\Sigma_4$ for $N_{b,1}=4$: $I_\Delta(i_{1,1})=2i_{1,1}+\Delta$, $\Delta=0, 1, 2, 3$; $i_{1,1}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$\Sigma_8$ for $N_{b,1}=8$: $I_\Delta(i_{1,1})=2i_{1,1}+\Delta$, $\Delta=0, 1, 2, \ldots, 7$; $i_{1,1}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

Another example collection of codebooks $\Sigma_1 \cup \Sigma_2 \cup \Sigma_4 \cup \Sigma_8$ with different values of $N_{b,1}$ for $M_a=2$ and $O_1=8$ can be described as follows:

$\Sigma_1$ for $N_{b,1}=1$: $I_\Delta(i_{1,1})=2i_{1,1}$; $i_{1,1}=0, 1, 2, \ldots, 7$ (size-8 set), $$v_m = \begin{bmatrix} 1 & e^{j\frac{2\pi m}{16}} \end{bmatrix}^T$$

$\Sigma_2$ for $N_{b,1}=2$: $I_\Delta(i_{1,1})=2i_{1,1}+\Delta$, $\Delta=0, 1$; $i_{1,1}=0, 1, 2, \ldots, 7$ (size-8 set), $$v_m = \begin{bmatrix} 1 & e^{j\frac{2\pi m}{16}} \end{bmatrix}^T$$

$\Sigma_4$ for $N_{b,1}=4$: $I_\Delta(i_{1,1})=2i_{1,1}+\Delta$, $\Delta=0, 1, 2, 3$; $i_{1,1}=0, 1, 2, \ldots, 7$ (size-8 set), $$v_m = \begin{bmatrix} 1 & e^{j\frac{2\pi m}{16}} \end{bmatrix}^T$$

$\Sigma_8$ for $N_{b,1}=8$: $I_\Delta(i_{1,1})=2i_{1,1}+\Delta$, $\Delta=0, 1, 2, \ldots, 7$; $i_{1,1}=0, 1, 2, \ldots, 7$ (size-8 set), $$v_m = \begin{bmatrix} 1 & e^{j\frac{2\pi m}{16}} \end{bmatrix}^T$$

Another example collection of codebooks $\Sigma_1 \cup \Sigma_2 \cup \Sigma_4 \cup \Sigma_8$ with different values of $N_{b,1}$ for $M_a=2$ and $O_1=4$ can be described as follows:

$\Sigma_1$ for $N_{b,1}=1$: $I_\Delta(i_{1,1})=2i_{1,1}$; $i_{1,1}=0, 1, 2, 3$ (size-4 set), $$v_m = \begin{bmatrix} 1 & e^{j\frac{2\pi m}{8}} \end{bmatrix}^T$$

$\Sigma_2$ for $N_{b,1}=2$: $I_\Delta(i_{1,1})=2i_{1,1}+\Delta$, $\Delta=0, 1$; $i_{1,1}=0, 1, 2, 3$ (size-4 set), $$v_m = \begin{bmatrix} 1 & e^{j\frac{2\pi m}{8}} \end{bmatrix}^T$$

$\Sigma_4$ for $N_{b,1}=4$: $I_\Delta(i_{1,1})=2i_{1,1}+\Delta$, $\Delta=0, 1, 2, 3$; $i_{1,1}=0, 1, 2, 3$ (size-4 set), $$v_m = \begin{bmatrix} 1 & e^{j\frac{2\pi m}{8}} \end{bmatrix}^T$$

$\Sigma_8$ for $N_{b,1}=8$: $I_\Delta(i_{1,1})=2i_{1,1}+\Delta$, $\Delta=0, 1, 2, \ldots, 7$; $i_{1,1}=0, 1, 2, 3$ (size-4 set), $$v_m = \begin{bmatrix} 1 & e^{j\frac{2\pi m}{8}} \end{bmatrix}^T$$

The above four example designs can be modified in various manners without departing from the present disclosure. For instance, a subset of $N_{b,1} \in \{1, 2, 4, 8\}$ values can be used such as $\{1, 2, 4\}$ or $\{2, 4\}$ or $\{1, 4\}$. A larger collection of codebooks can also be constructed from codebooks with different values of $N_{b,1}$, $M_a$, and/or $O_1$.

A first-stage precoder codebook for a second dimension $W_{1,2}(i_{1,2})$ can be described for a uniform length-$N_a$ dual-polarized array in according to Equation 5 below. Each of the precoders in this codebook can be described as a pair of identical length-$N_a$ discrete Fourier Transform (DFT) vectors arranged in a block diagonal form, each of the two associated with a polarization group. Here $W_{1,2}(i_{1,2})$ is a $2N_a \times N_{b,2}$ block diagonal matrix including $N_{b,2}$ beams per polarization group. A set of indices $\{I_0(i_{1,2}), I_1(i_{1,2}), \ldots, I_{N_{b,2}-1}(i_{1,2})\}$ which depends on a precoder index $i_{1,2}$ is utilized to parameterize the beams/precoding vectors. The integer parameter $O_2$ denotes the amount of oversampling on the phase domain for the second dimension. This parameter can be made configurable for a UE just as other codebooks parameters.

$$W_{1,2}(i_{1,2}) = \frac{1}{\sqrt{2N_a}} \times \begin{bmatrix} V_{i_{1,2}} & 0 \\ 0 & V_{i_{1,2}} \end{bmatrix}, \quad \text{(Equation 5)}$$

$$V_{i_{1,2}} = \begin{bmatrix} v_{I_0(i_{1,2})} & v_{I_1(i_{1,2})} & \cdots & v_{I_{N_{b,2}-1}(i_{1,2})} \end{bmatrix}$$

$$v_m = \begin{bmatrix} 1 & e^{j\frac{2\pi m}{O_2 N_a}} & e^{j\frac{4\pi m}{O_2 N_a}} & \cdots & e^{j\frac{2\pi(N_a-1)m}{O_2 N_a}} \end{bmatrix}^T$$

Based on Equation 5, an example collection of codebooks $\Sigma_1 \cup \Sigma_2 \cup \Sigma_4 \cup \Sigma_8$ with different values of $N_{b,2}$ for $N_a=4$ and $O_2=8$ can be described as follows:

$\Sigma_1$ for $N_{b,2}=1$: $I_\Delta(i_{1,2})=2i_{1,2}$; $i_{1,2}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

$\Sigma_2$ for $N_{b,2}=2$: $I_\Delta(i_{1,2})=2i_{1,2}+\Delta$, $\Delta=0, 1$; $i_{1,2}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

$\Sigma_4$ for $N_{b,2}=4$: $I\Delta(i_{1,2})=2i_{1,2}+\Delta$, $\Delta=0, 1, 2, 3$; $i_{1,2}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

$\Sigma_8$ for $N_{b,2}=8$: $I_\Delta(i_{1,2})=2i_{1,2}+\Delta$, $\Delta=0, 1, 2, \ldots, 7$; $i_{1,2}=0, 1, 2, \ldots, 15$ (size-16 set), $$v_m = \begin{bmatrix} 1 & e^{j\frac{2\pi m}{32}} & e^{j\frac{4\pi m}{32}} & e^{j\frac{6\pi m}{32}} \end{bmatrix}^T$$

Another example collection of codebooks $\Sigma_1 \cup \Sigma_2 \cup \Sigma_4 \cup \Sigma_8$ with different values of $N_{b,2}$ for $N_a=4$ and $O_2=4$ can be described as follows:

$\Sigma_1$ for $N_{b,2}=1$: $I_\Delta(i_{1,2})=2i_{1,2}$; $i_{1,2}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$\Sigma_2$ for $N_{b,2}=2$: $I_\Delta(i_{1,2})=2i_{1,2}+\Delta$, $\Delta=0, 1$; $i_{1,2}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$\Sigma_4$ for $N_{b,2}=4$: $I\Delta(i_{1,2})=2i_{1,2}+\Delta$, $\Delta=0, 1, 2, 3$; $i_{1,2}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$\Sigma_8$ for $N_{b,2}=8$: $I\Delta(i_{1,2})=2i_{1,2}+\Delta$, $\Delta=0, 1, 2, \ldots, 7$; $i_{1,2}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

Another example collection of codebooks $\Sigma_1 \cup \Sigma_2 \cup \Sigma_4 \cup \Sigma_8$ with different values of $N_{b,2}$ for $N_a=2$ and $O_2=8$ can be described as follows:

$\Sigma_1$ for $N_{b,2}=1$: $I_\Delta(i_{1,2})=2i_{1,2}$; $i_{1,2}=0, 1, 2, \ldots, 7$ (size-8 set), $$v_m = [1 e^{j2\pi m/16}]^T$$

$\Sigma_2$ for $N_{b,2}=2$: $I_\Delta(i_{1,2})=2i_{1,2}+\Delta$, $\Delta=0, 1$; $i_{1,2}=0, 1, 2, \ldots, 7$ (size-8 set), $$v_m = [1 e^{j2\pi m/16}]^T$$

$\Sigma_4$ for $N_{b,2}=4$: $I_\Delta(i_{1,2})=2i_{1,2}+\Delta$, $\Delta=0, 1, 2, 3$; $i_{1,2}=0, 1, 2, \ldots, 7$ (size-8 set), $$v_m = [1 e^{j2\pi m/16}]^T$$

$\Sigma_8$ for $N_{b,2}=8$: $I_\Delta(i_{1,2})=2i_{1,2}+\Delta$, $\Delta=0, 1, 2, \ldots, 7$; $i_{1,2}=0, 1, 2, \ldots, 7$ (size-8 set), $$v_m = [1 e^{j2\pi m/16}]^T$$

Another example collection of codebooks $\Sigma_1 \cup \Sigma_2 \cup \Sigma_4 \cup \Sigma_8$ with different values of $N_{b,2}$ for $N_a=2$ and $O_2=4$ can be described as follows:

$\Sigma_1$ for $N_{b,2}=1$: $I_\Delta(i_{1,2})=2i_{1,2}$; $i_{1,2}=0, 1, 2, 3$ (size-4 set), $$v_m = [1 e^{j2\pi m/8}]^T$$

$\Sigma_2$ for $N_{b,2}=2$: $I_\Delta(i_{1,2})=2i_{1,2}+\Delta$, $\Delta=0, 1$; $i_{1,2}=0, 1, 2, 3$ (size-4 set), $$v_m = [1 e^{j2\pi m/8}]^T$$

$\Sigma_4$ for $N_{b,2}=4$: $I_\Delta(i_{1,2})=2i_{1,2}+\Delta$, $\Delta=0, 1, 2, 3$; $i_{1,2}=0, 1, 2, 3$ (size-4 set), $$v_m = [1 e^{j2\pi m/8}]^T$$

$\Sigma_8$ for $N_{b,2}=8$: $I_\Delta(i_{1,2})=2i_{1,2}+\Delta$, $\Delta=0, 1, 2, \ldots, 7$; $i_{1,2}=0, 1, 2, 3$ (size-4 set), $$v_m = [1 e^{j2\pi m/8}]^T$$

The above four example designs can be modified in various manners without departing from the present disclosure. For instance, a subset of $N_{b,2} \in \{1, 2, 4, 8\}$ values can be used such as $\{1, 2, 4\}$ or $\{2, 4\}$ or $\{1, 4\}$. A larger collection of codebooks can also be constructed from codebooks with different values of $N_{b,2}$, $N_a$, and/or $O_2$.

For the full KP design, second-stage precoders $W_{2,1}(i_{2,1})$ and $W_{2,2}(i_{2,2})$ are needed for a first and a second dimension, respectively. Just as the first-stage codebooks, the second-stage codebooks can be configured based on the values of $N_{b,1}$ and $N_{b,2}$. An example design for the second-stage codebooks can be described in Equations 6 and 7, provided below, for rank-1 (one transmission layer). Here the first and second dimensions are associated with single-polarized and dual-polarized port arrays, respectively.

$$W_{2,1}(i_{2,1}) \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\} = \{d_1, d_2, \ldots, d_{N_{b,1}-1}\} \quad \text{Equation 6}$$

For the first dimension, vector $d_i$ is a length-$N_{b,1}$ selection vector which is composed of 0 except at the i-th element (where its value is 1).

$$W_{2,2}(i_{2,2}) = \begin{bmatrix} u \\ e^{j\phi} u \end{bmatrix}, \phi \in \left\{0, \frac{2\pi}{N}, \frac{4\pi}{N}, \ldots, \frac{2\pi(N-1)}{N}\right\}, \quad \text{Equation 7}$$

$$u \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\} = \{d_1, d_2, \ldots, d_{N_{b,2}-1}\}$$

For the second dimension, vector $d_i$ is a length-$N_{b,2}$ selection vector which is composed of 0 except at the i-th element (where its value is 1). This selection vector represents a selection operation which is replicated for the two polarization groups. In addition, a phase shift of $e^{j\phi}$ (also termed co-phasing) is added between the two polarization groups where N is the number of phase angles.

For the partial KP design, a second-stage precoder $W_2(i_2)$ is needed for the combination of a first and a second dimension. Just as the first-stage codebooks, the second-stage codebook can be configured based on the values of $N_{b,1}$ and $N_{b,2}$. An example design for the second-stage codebook which performs beam selection and co-phasing between two polarization groups can be described in (8) for rank-1 (one transmission layer). Here the combination of the first and second dimensions is associated with dual-polarized port arrays.

$$W_2(i_2) = \begin{bmatrix} u \\ e^{j\phi} u \end{bmatrix}, \phi \in \left\{0, \frac{2\pi}{N}, \frac{4\pi}{N}, \ldots, \frac{2\pi(N-1)}{N}\right\}, \quad \text{Equation 8}$$

$$u \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\} = \{d_1, d_2, \ldots, d_{N_b-1}\}$$

The vector $d_i$ is a length-$N_b$ selection vector ($N_b = N_{b,1} \times N_{b,2}$) which is composed of 0 except at the i-th element (where its value is 1). In (7) or (8), N is the number of phase angles. For instance, with N=4 (QPSK co-phasing), the embodiment in (8) can be described as follows.

For $N_b=1$: (size-4 codebook)

$$W_2(i_2) \in \left\{ \begin{bmatrix} 1 \\ \pm 1 \end{bmatrix}, \begin{bmatrix} 1 \\ \pm j \end{bmatrix} \right\}$$

For $N_b=2$: (size-8 codebook)

$$W_2(i_2) \in \left\{ \begin{bmatrix} 1 \\ 0 \\ \pm 1 \\ 0 \end{bmatrix}, \begin{bmatrix} 0 \\ 1 \\ 0 \\ \pm 1 \end{bmatrix}, \begin{bmatrix} 1 \\ 0 \\ \pm j \\ 0 \end{bmatrix}, \begin{bmatrix} 0 \\ 1 \\ 0 \\ \pm j \end{bmatrix} \right\}$$

For $N_b=4$: (size-16 codebook)

$$W_2(i_2) \in$$

$$\left\{ \begin{bmatrix} d_1 \\ \pm d_1 \end{bmatrix}, \begin{bmatrix} d_2 \\ \pm d_2 \end{bmatrix}, \begin{bmatrix} d_3 \\ \pm d_3 \end{bmatrix}, \begin{bmatrix} d_4 \\ \pm d_4 \end{bmatrix}, \begin{bmatrix} d_1 \\ \pm j d_1 \end{bmatrix}, \begin{bmatrix} d_2 \\ \pm j d_2 \end{bmatrix}, \begin{bmatrix} d_3 \\ \pm j d_3 \end{bmatrix}, \begin{bmatrix} d_4 \\ \pm j d_4 \end{bmatrix} \right\}$$

where $d_n$ is a length-4 vector with all zeros except at the n-th position. For instance, $$d_2 = \begin{bmatrix} 0 \\ 1 \\ 0 \\ 0 \end{bmatrix}.$$

For $N_b=8$: (size-32 codebook)

$$W_2(i_2) \in \left\{ \begin{array}{l} \begin{bmatrix} d_1 \\ \pm d_1 \end{bmatrix}, \begin{bmatrix} d_2 \\ \pm d_2 \end{bmatrix}, \begin{bmatrix} d_3 \\ \pm d_3 \end{bmatrix}, \begin{bmatrix} d_4 \\ \pm d_4 \end{bmatrix}, \begin{bmatrix} d_5 \\ \pm d_5 \end{bmatrix}, \begin{bmatrix} d_6 \\ \pm d_6 \end{bmatrix}, \\ \begin{bmatrix} d_7 \\ \pm d_7 \end{bmatrix}, \begin{bmatrix} d_8 \\ \pm d_8 \end{bmatrix}, \begin{bmatrix} d_1 \\ \pm j d_1 \end{bmatrix}, \begin{bmatrix} d_2 \\ \pm j d_2 \end{bmatrix}, \\ \begin{bmatrix} d_3 \\ \pm j d_3 \end{bmatrix}, \begin{bmatrix} d_4 \\ \pm j d_4 \end{bmatrix}, \begin{bmatrix} d_5 \\ \pm j d_5 \end{bmatrix}, \begin{bmatrix} d_6 \\ \pm j d_6 \end{bmatrix}, \begin{bmatrix} d_7 \\ \pm j d_7 \end{bmatrix}, \begin{bmatrix} d_8 \\ \pm j d_8 \end{bmatrix} \end{array} \right\}$$

where $d_n$ is a length-8 vector with all zeros except at the n-th position.

The above embodiments of the first-stage codebooks for the first and second dimensions can be combined with the second-stage codebooks according to the descriptions in Equations 2 or 3. Combining Equations 4 and 5 with Equations 6, 7, or 8 results in a composite codebook two-dimensional DFT precoders P(l, k, p) described in Equation 9, provided below.

$$P(l, k, p) = \frac{1}{\sqrt{2 M_a N_a}} \times \begin{bmatrix} v_{l}(i_{1,1}) \otimes u_{l_k}(i_{1,2}) \\ e^{j\phi_p} v_{l}(i_{1,1}) \otimes u_{l_k}(i_{1,2}) \end{bmatrix} = \quad \text{Equation 9}$$

$$\frac{1}{\sqrt{2 M_a N_a}} \times \begin{bmatrix} w_{l(i_{1,1}), l_k(i_{1,2})} \\ e^{j\phi_p} w_{l(i_{1,1}), l_k(i_{1,2})} \end{bmatrix}$$

-continued $$v_m = \begin{bmatrix} 1 & e^{j\frac{2\pi m}{O_1 M_a}} & e^{j\frac{4\pi m}{O_1 M_a}} & \ldots & e^{j\frac{2\pi(M_a-1)m}{O_1 M_a}} \end{bmatrix}^T,$$

$$u_n = \begin{bmatrix} 1 & e^{j\frac{2\pi m}{O_2 N_a}} & e^{j\frac{4\pi m}{O_2 N_a}} & \ldots & e^{j\frac{2\pi(N_a-1)m}{O_2 N_a}} \end{bmatrix}^T$$

$$w_{m,n} = \begin{bmatrix} u_n^T & e^{j\frac{2\pi m}{O_r N_r}} u_n^T & e^{j\frac{4\pi m}{O_r N_r}} u_n^T & \ldots & e^{j\frac{2\pi(N_r-1)m}{O_r N_r}} u_n^T \end{bmatrix}^T$$

$$\phi_p = (p-1)\frac{\pi}{2},$$

$$p = 0, 1, 2, 3$$

The resulting codebook description is then configurable by six codebook parameters $(O_1, O_2)$, $(M_a, N_a)$, and/or $(N_{b,1}, N_{b,2})$. Depending on the number of beams in two dimensions, several codebook groups can be defined. In this case, the resulting codebook is configurable by five parameters $(O_1, O_2)$, $(M_a, N_a)$, and CodebookGroup. The codebook selection parameter CodebookGroup is a function of or associated with $(N_{b,1}, N_{b,2})$. The values of the five parameters are configurable and can be signaled from an eNodeB to a UE either semi-statically via higher-layer (RRC) signaling, or dynamically via a DL control channel/signaling. In another example, at least one of these parameters can be configured via RRC signaling and the rests via a DL control signaling.

Taking the description in Equation 9 further based on various embodiments described in the preceding paragraphs, another embodiment can be constructed with two codebook groups where CodebookGroup=1 corresponds to $(N_{b,1}, N_{b,2})=(2, 2)$ and CodebookGroup=2 corresponds to $(N_{b,1}, N_{b,2})=(4, 1)$ which can be described as follows.

CodebookGroup=1: Each precoding matrix P(l, k, p) is a function of three PMI parameters: $i_{1,1}$, $i_{1,2}$, and $i_2$.

$$I_l(i_{1,1})=2i_{1,1}+l, l=0,1; I_k(i_{1,2})=2i_{1,2}+k, k=0,1$$

$$P(l, k, p) = \frac{1}{\sqrt{2 M_a N_a}} \times \begin{bmatrix} w_{I_l(i_{1,1}), I_k(i_{1,2})} \\ e^{j\phi_p} w_{I_l(i_{1,1}), I_k(i_{1,2})} \end{bmatrix} \quad \text{Equation 10}$$

The following 6 codebooks in this group can be further described as follows:

$(M_a, N_a) = (2, 2)$ and $(O_1, O_2) = (4, 4)$:

$$w_{m,n} = \begin{bmatrix} u_n^T & e^{j\frac{2\pi m}{8}} u_n^T \end{bmatrix}^T, u_n = \begin{bmatrix} 1 & e^{j\frac{2\pi n}{8}} \end{bmatrix}^T; i_{1,1} = 0, 1, 2, 3,$$

$i_{1,2} = 0, 1, 2, 3$ $(M_a, N_a) = (2, 2)$ and $(O_1, O_2) = (8, 8)$:

$$w_{m,n} = \begin{bmatrix} u_n^T & e^{j\frac{2\pi m}{16}} u_n^T \end{bmatrix}^T, u_n = \begin{bmatrix} 1 & e^{j\frac{2\pi n}{16}} \end{bmatrix}^T;$$

$i_{1,1} = 0, 1, 2, \ldots, 7, i_{1,2} = 0, 1, 2, \ldots, 7$ $(M_a, N_a) = (2, 4)$ and $(O_1, O_2) = (8, 4)$:

$$w_{m,n} = \begin{bmatrix} u_n^T & e^{j\frac{2\pi m}{16}} u_n^T \end{bmatrix}^T, u_n = \begin{bmatrix} 1 & e^{j\frac{2\pi n}{16}} & e^{j\frac{4\pi n}{16}} & e^{j\frac{6\pi n}{16}} \end{bmatrix}^T;$$

$i_{1,1} = 0, 1, 2, \ldots, 7, i_{1,2} = 0, 1, 2, \ldots, 7$ $(M_a, N_a) = (2, 4)$ and $(O_1, O_2) = (8, 8)$:

$$w_{m,n} = \begin{bmatrix} u_n^T & e^{j\frac{2\pi m}{16}} u_n^T \end{bmatrix}^T, u_n = \begin{bmatrix} 1 & e^{j\frac{2\pi n}{32}} & e^{j\frac{4\pi n}{32}} & e^{j\frac{6\pi n}{32}} \end{bmatrix}^T;$$

$i_{1,1} = 0, 1, 2, \ldots, 7, i_{1,2} = 0, 1, 2, \ldots, 15$ $(M_a, N_a) = (4, 2)$ and $(O_1, O_2) = (8, 4)$:

$$w_{m,n} = \begin{bmatrix} u_n^T & e^{j\frac{2\pi m}{32}} u_n^T & e^{j\frac{4\pi m}{32}} u_n^T & e^{j\frac{6\pi m}{32}} u_n^T \end{bmatrix}^T, u_n = \begin{bmatrix} 1 & e^{j\frac{2\pi n}{8}} \end{bmatrix}^T;$$

$i_{1,1} = 0, 1, 2, \ldots, 15, i_{1,2} = 0, 1, 2, 3$ $(M_a, N_a) = (4, 2)$ and $(O_1, O_2) = (4, 4)$:

$$w_{m,n} = \begin{bmatrix} u_n^T & e^{j\frac{2\pi m}{16}} u_n^T & e^{j\frac{4\pi m}{16}} u_n^T & e^{j\frac{6\pi m}{16}} u_n^T \end{bmatrix}^T, u_n = \begin{bmatrix} 1 & e^{j\frac{2\pi n}{8}} \end{bmatrix}^T;$$

$i_{1,1} = 0, 1, 2, \ldots, 7, i_{1,2} = 0, 1, 2, 3$

CodebookGroup=2: Each precoding matrix P(l, k, p) is a function of three PMI parameters: $i_{1,1}$, $i_{1,2}$, and $i_2$:

$$I_l(i_{1,1}) = 2i_{1,1} + l, \quad \text{Equation 11}$$

$l = 0, 1, 2, 3;$ $$I_k(i_{1,2}) = 2i_{1,2}$$

$$P(l, k, p) = \begin{cases} \frac{1}{\sqrt{2 M_a N_a}} \times \begin{bmatrix} w_{I_l(i_{1,1}), I_k(i_{1,2})} \\ e^{j\phi_p} w_{I_l(i_{1,1}), I_k(i_{1,2})} \end{bmatrix}, & M_a \geq N_a \\ \frac{1}{\sqrt{2 M_a N_a}} \times \begin{bmatrix} w_{I_k(i_{1,2}), I_l(i_{1,1})} \\ e^{j\phi_p} w_{I_k(i_{1,2}), I_l(i_{1,1})} \end{bmatrix}, & M_a < N_a \end{cases}$$

TABLE 1

| CodebookGroup = 1 | | | | | | | |
|---|---|---|---|---|---|---|---|
| $i_2 = 0$ | $i_2 = 1$ | $i_2 = 2$ | $i_2 = 3$ | $i_2 = 4$ | $i_2 = 5$ | $i_2 = 6$ | $i_2 = 7$ |
| P(0, 0, 0) | P(0, 0, 1) | P(0, 0, 2) | P(0, 0, 3) | P(1, 0, 0) | P(1, 0, 1) | P(1, 0, 2) | P(1, 0, 3) |
| $i_2 = 8$ | $i_2 = 8$ | $i_2 = 10$ | $i_2 = 11$ | $i_2 = 12$ | $i_2 = 13$ | $i_2 = 14$ | $i_2 = 15$ |
| P(0, 1, 0) | P(0, 1, 1) | P(0, 1, 2) | P(0, 1, 3) | P(1, 1, 0) | P(1, 1, 1) | P(1, 1, 2) | P(1, 1, 3) |

TABLE 2

| | | | CodebookGroup = 2 | | | | |
|---|---|---|---|---|---|---|---|
| $i_2 = 0$ | $i_2 = 1$ | $i_2 = 2$ | $i_2 = 3$ | $i_2 = 4$ | $i_2 = 5$ | $i_2 = 6$ | $i_2 = 7$ |
| P(0, 0, 0) | P(0, 0, 1) | P(0, 0, 2) | P(0, 0, 3) | P(1, 0, 0) | P(1, 0, 1) | P(1, 0, 2) | P(1, 0, 3) |
| $i_2 = 8$ | $i_2 = 8$ | $i_2 = 10$ | $i_2 = 11$ | $i_2 = 12$ | $i_2 = 13$ | $i_2 = 14$ | $i_2 = 15$ |
| P(2, 0, 0) | P(2, 0, 1) | P(2, 0, 2) | P(2, 0, 3) | P(3, 0, 0) | P(3, 0, 1) | P(3, 0, 2) | P(3, 0, 3) |

The following 6 codebooks in this group can be further described as follows:

$(M_a, N_a) = (2, 4)$ and $(O_1, O_2) = (8, 4)$:

$$w_{m,n} = \left[ u_n^T \quad e^{j\frac{2\pi m}{16}} u_n^T \right]^T, u_n = \left[ 1 \quad e^{j\frac{2\pi n}{16}} \quad e^{j\frac{4\pi n}{16}} \quad e^{j\frac{6\pi n}{16}} \right]^T$$

$i_{1,1} = 0, 1, 2, \ldots, 7, i_{1,2} = 0, 1, 2, \ldots, 7$ $(M_a, N_a) = (2, 4)$ and $(O_1, O_2) = (8, 8)$:

$$w_{m,n} = \left[ u_n^T \quad e^{j\frac{2\pi m}{16}} u_n^T \right]^T, u_n = \left[ 1 \quad e^{j\frac{2\pi n}{32}} \quad e^{j\frac{4\pi n}{32}} \quad e^{j\frac{6\pi n}{32}} \right]^T$$

$i_{1,1} = 0, 1, 2, \ldots, 7, i_{1,2} = 0, 1, 2, \ldots, 15$ $(M_a, N_a) = (2, 2)$ and $(O_1, O_2) = (4, 4)$:

$$w_{m,n} = \left[ u_n^T \quad e^{j\frac{2\pi m}{8}} u_n^T \right]^T, u_n = \left[ 1 \quad e^{j\frac{2\pi n}{8}} \right]^T$$

$i_{1,1} = 0, 1, 2, 3, i_{1,2} = 0, 1, 2, 3$ and $(O_1, O_2) = (8, 8)$:

$$w_{m,n} = \left[ u_n^T \quad e^{j\frac{2\pi m}{16}} u_n^T \right]^T, u_n = \left[ 1 \quad e^{j\frac{2\pi n}{16}} \right]^T$$

$i_{1,1} = 0, 1, 2, \ldots, 7, i_{1,2} = 0, 1, 2, \ldots, 7$ $(M_a, N_a) = (4, 2)$ and $(O_1, O_2) = (8, 4)$:

$$w_{m,n} = \left[ u_n^T \quad e^{j\frac{2\pi m}{32}} u_n^T \quad e^{j\frac{4\pi m}{32}} u_n^T \quad e^{j\frac{6\pi m}{32}} u_n^T \right]^T, u_n = \left[ 1 \quad e^{j\frac{2\pi n}{8}} \right]^T$$

$i_{1,1} = 0, 1, 2, \ldots, 15, i_{1,2} = 0, 1, 2, 3 (M_a, N_a) = (2, 2)$ $(M_a, N_a) = (4, 2)$ and $(O_1, O_2) = (4, 4)$:

$$w_{m,n} = \left[ u_n^T \quad e^{j\frac{2\pi m}{16}} u_n^T \quad e^{j\frac{4\pi m}{16}} u_n^T \quad e^{j\frac{6\pi m}{16}} u_n^T \right]^T, u_n = \left[ 1 \quad e^{j\frac{2\pi n}{8}} \right]^T$$

$i_{1,1} = 0, 1, 2, \ldots, 7, i_{1,2} = 0, 1, 2, 3$

In another example, the second codebook group (CodebookGroup=2) can be described by substituting Equation 11 with Equation 10, but using TABLE 2 only for $(M_a, N_a)=(2, 2)$ and $(M_a, N_a)=(4, 2)$ and using TABLE 3 for $(M_a, N_a)=(2, 4)$.

TABLE 3

| | | | Alternative table for CodebookGroup = 2 and $(M_a, N_a) = (2, 4)$ | | | | |
|---|---|---|---|---|---|---|---|
| $i_2 = 0$ | $i_2 = 1$ | $i_2 = 2$ | $i_2 = 3$ | $i_2 = 4$ | $i_2 = 5$ | $i_2 = 6$ | $i_2 = 7$ |
| P(0, 0, 0) | P(0, 0, 1) | P(0, 0, 2) | P(0, 0, 3) | P(0, 1, 0) | P(0, 1, 1) | P(0, 1, 2) | P(0, 1, 3) |
| $i_2 = 8$ | $i_2 = 8$ | $i_2 = 10$ | $i_2 = 11$ | $i_2 = 12$ | $i_2 = 13$ | $i_2 = 14$ | $i_2 = 15$ |
| P(0, 2, 0) | P(0, 2, 1) | P(0, 2, 2) | P(0, 2, 3) | P(0, 3, 0) | P(0, 3, 1) | P(0, 3, 2) | P(0, 3, 3) |

A larger collection of groups where one or more codebook groups are added into the two codebook groups given above can be constructed. In this case, CodebookGroup parameter is configured by an eNodeB for a UE to select one out of a plurality of codebook groups, two of which are given above.

Various embodiments of present disclosure also include a DL signaling from a serving eNodeB to a scheduled UE to enable the aforementioned codebook selection. One signaling embodiment is to assign one codebook selection indicator/parameter to each of the two dimensions (horizontal and vertical) where dual-stage codebook structure is utilized. Another embodiment is to assign one selection indicator to jointly represent both dimensions.

For both DL signaling embodiments, one example is to signal a codebook selection indicator which corresponds to codebook subset selection or subset restriction. For example, if one selection indicator is assigned to each of the two dimensions, a two-bit parameter named CB-HIndicator facilitates selection of one out of three or four subsets for horizontal codebook. A two-bit parameter named CB-VIndicator facilitates selection of one out of three or four subsets for vertical codebook. If one selection indicator is assigned to jointly represent both dimensions, one N-bit parameter (for example, CB-Indicator or the aforementioned CodebookGroup) is utilized to facilitate selection of one out of multiple codebooks or codebook tables.

Another example method is to signal a parameter which indicates the number of horizontal beams per polarization group or the number of vertical beams in relation to a first-stage precoder ($W_{1,1}$ or $W_{1,2}$). In relation to the aforementioned codebook design embodiments, the parameters $N_{b,1}$ and $N_{b,2}$ signify the number of beams pertaining to the horizontal and vertical precoding, respectively. Therefore, a parameter which is a function of $N_{b,1}$ or $N_{b,2}$ is signaled by a serving eNodeB to a scheduled UE. A variation of this method is to signal a single parameter which indicates the number of two-dimensional beams (taking into account both horizontal and vertical dimensions) per polarization group.

Yet another example method can be devised as another variation of the previous example method. This example relates the signaling with the number of CSI-RS ports assigned to the UE. That is, this signaling informs the UE not only codebook selection, but also the number of CSI-RS ports that the UE assumes for CSI measurements. For example, the number of horizontal and vertical CSI-RS ports can be signaled by the eNodeB through UE-specific parameters NumCSIRSPorts-H ($2N_a$ in the above codebook embodiments) and NumCSIRSPorts-V ($M_a$ in the above codebook embodiments), respectively. Each of these two parameters, or a combination of these two parameters, can either be directly correlated with or complementary to codebook selection. In another example, the parameters $N_a$ and $M_a$ in the above codebook embodiments, which correspond to the number of horizontal and vertical antenna ports, respectively, can be signaled. In another example, the total number of CSI-RS ports (NumCSIRSPorts=NumCSIRSPorts-H×NumCSIRSPorts-V) can be signaled.

Any of the aforementioned three example methods can be signaled from an eNodeB to a UE in one of the three other example implementations. One implementation is to utilize higher-layer (RRC) signaling. The parameters or indicators of interest are included in ASN.1 and transmitted as UE-specific configurations. Another implementation is to include those parameters or indicators in a system information block (SIB) which is transmitted via dynamic broadcast channel (D-BCH). These two implementations allow semi-static (relatively slow or long-term) reconfiguration of these parameters. A third implementation is to include these parameters in an uplink (UL) grant as a field within a DL control information (DCI) format. This allows dynamic reconfiguration. Using the third above-discussed example method as an example, assuming that the possible number of CSI-RS ports per dimension is 1, 2, 4, or 8, two 2-bit DCI fields NumCSIRSPorts-H and NumCSIRSPorts-V (or, in another example, one 4-bit DCI field NumCSIRSPorts) are included in a DCI format. This example can be extended for the other two example methods.

Figure 6A:
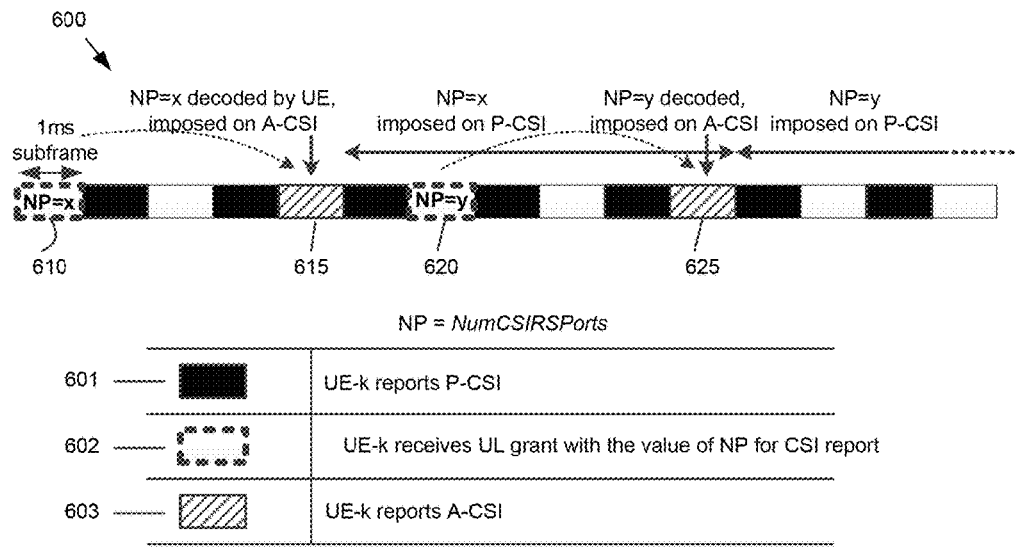
FIGS. 6A and 6B illustrate two example DL/UL timing diagrams for dynamic signaling of the number of antenna ports according to various embodiments of the present disclosure.

Upon receiving and successfully decoding such signaling from a serving eNodeB, a UE assumes the latest value of the pertinent parameter (associated with any of the three aforementioned methods) for CSI calculation. FIG. 6A illustrates an example UE procedure 600 for CSI reporting. The depiction of procedure 600 is for illustrative purposes; other embodiments of the procedure 600 could be used without departing from the scope of the present disclosure.

Aperiodic PUSCH-based CSI reporting is denoted as A-CSI and periodic PUCCH-based CSI reporting as P-CSI. The UE (e.g., one of UEs 111-116) is configured to report both A-CSI and P-CSI where the UL subframes associated with A-CSI and P-CSI reporting are denoted as 601, 602, and 603, respectively. The third discussed example method is used for illustrative purposes. Upon receiving and decoding an UL grant containing NumCSIRSPorts=x in 610, the UE applies the value x starting from 615—both for the requested A-CSI and the subsequent P-CSI reporting. This holds until the UE receives and decodes another UL grant containing NumCSIRSPorts=y in 620 which starts to be applied in 625, both for the requested A-CSI and the subsequent P-CSI reporting. Here, four-subframe offset is assumed from the reception of the UL grant to the associated CSI reporting.

In addition to the disclosed DL signaling, the present disclosure also addresses an uplink signaling method which facilitates a UE to recommend a value of at least one of the pertinent parameters (associated with one of the three aforementioned methods). Using the third method for illustrative purposes, a UE feeds back a recommended value of NumCSIRSPorts to a serving eNodeB. This is applicable, for example, when the eNodeB has no access on any long-term DL channel statistics.

Figure 6B:
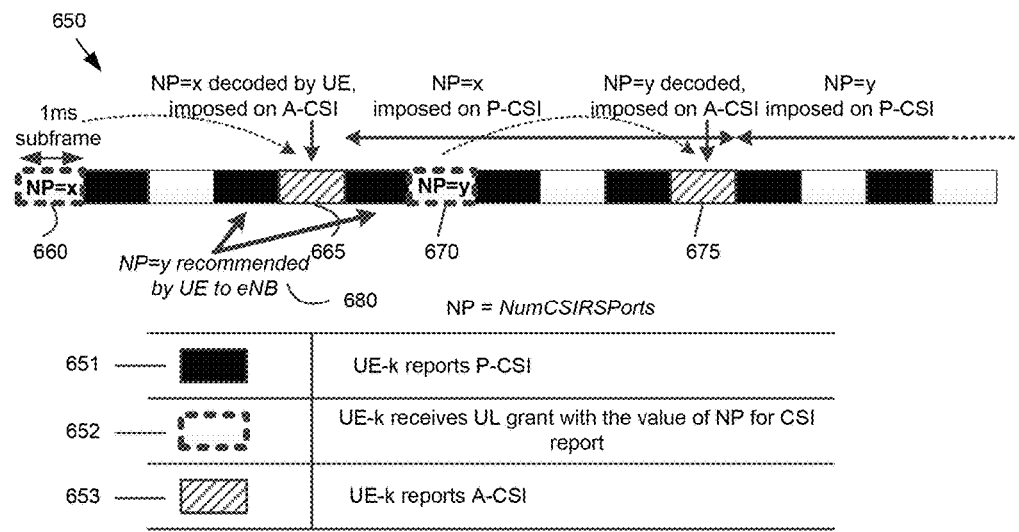

This procedure is illustrated in FIG. 6B which illustrates another example UE procedure 650 for CSI reporting. The depiction of procedure 650 is for illustrative purposes; other embodiments of the procedure 650 could be used without departing from the scope of the present disclosure. In this illustrative embodiment, the UE (e.g., one of UEs 111-116) reports a recommended value of NumCSIRSPorts 680 which facilitates a reconfiguration of NumCSIRSPorts via an UL grant in 670. The UE is configured to report both A-CSI and P-CSI where the UL subframes associated with A-CSI and P-CSI reporting are denoted as 651, 652, and 653, respectively. Upon receiving and decoding an UL grant containing NumCSIRSPorts=x in 660, the UE applies the value x starting from 665—both for the requested A-CSI and the subsequent P-CSI reporting. This holds until the UE receives and decodes another UL grant containing NumCSIRSPorts=y in 670 which starts to be applied in 675, both for the requested A-CSI and the subsequent P-CSI reporting.

As previously mentioned, the parameter NumCSIRSPorts (or separately NumCSIRSPorts-H and NumCSIRSPorts-V), representing a recommended number of CSI-RS ports, is example and associated with the third method. The uplink signaling method described in the previous and following paragraphs apply to the first (signaling of CB-HIndicator and CB-VIndicator or CB-Indicator) and second (signaling of $N_{b,2}$ and $N_{b,1}$) methods as well.

To facilitate such UE reporting, the aforementioned new type of CSI feedback NumCSIRSPorts (for illustrative purposes abbreviated as NPI using the third method for illustrative purposes, or else CB-HIndicator and CB-VIndicator, or else CB-Indicator, or else $N_{b,2}$ and $N_{b,1}$) can be defined and reported separately from the existing CSI reporting. In another example, this parameter can be jointly encoded with the existing CSI parameters to minimize the amount of overhead increase. For example, NumCSIRSPorts can be jointly encoded with RI and PMI1 ($i_1$) for periodic PUCCH-based reporting mode 1-1 submode 1. In another example, NumCSIRSPorts can be jointly encoded with RI for periodic PUCCH-based reporting mode 1-1 submode 2.

TABLE 4 describes an example embodiment for periodic PUCCH-based reporting mode 1-1 submode 1 where some of the reserved hypotheses associated with joint encoding of RI and $i_1$ for 8 antenna ports are used to recommend a change in NPI. This table is applicable to the horizontal dimension. In this example, only h-NPI=1, 2, and 4 are supported. In another example, h-NPI=8 or other values can be added.

TABLE 4

Joint encoding of RI and $i_{1,2}$, along with h-NPI, for PUCCH mode 1-1 submode 1

| Value of $I_{RI/hPMI1}$ | RI | Hypothesis/recommendation |
|---|---|---|
| 0-7 | 1 | $i_{1,H} = 2I_{RI/hPMI1}$ |
| 8-15 | 2 | $i_{1,H} = 2(I_{RI/hPMI1} - 8)$ |
| 16-17 | 3 | $i_{1,H} = 2(I_{RI/hPMI1} - 16)$ |
| 18-19 | 4 | $i_{1,H} = 2(I_{RI/hPMI1} - 18)$ |
| 20-21 | 5 | $i_{1,H} = 2(I_{RI/hPMI1} - 20)$ |
| 22-23 | 6 | $i_{1,H} = 2(I_{RI/hPMI1} - 22)$ |
| 24-25 | 7 | $i_{1,H} = 2(I_{RI/hPMI1} - 24)$ |
| 26 | 8 | $i_{1,2} = 0$ |
| 27 | NA | h-NPI = 1 |
| 28 | NA | h-NPI = 2 |
| 29 | NA | h-NPI = 4 |
| 30-31 | Reserved | NA |

TABLE 5 describes an example embodiment for periodic PUCCH-based reporting mode 1-1 submode 1 similar to TABLE 4, but with the maximum recommended RI restricted to 2 and only 4 out of 16 available $W_{1,2}$ matrices.

TABLE 5

Joint encoding of RI and $i_{1,2}$, along with h-NPI, for PUCCH mode 1-1 submode 1

| Value of $I_{RI/hPMI1}$ | RI | Hypothesis/recommendation |
|---|---|---|
| 0-7 | 1 | $i_{1,H} = 2I_{RI/hPMI1}$ |
| 8-11 | 2 | $i_{1,H} = 2(I_{RI/hPMI1} - 8)$ |
| 12 | NA | h-NPI = 1 |
| 13 | NA | h-NPI = 2 |
| 14 | NA | h-NPI = 4 |
| 15-16 | Reserved | NA |

Further optimization for NPI signaling can be achieved by signaling a difference in recommended NPI. For example, if h-NPI(0)=1, h-NPI(1)=2, and h-NPI(2)=4, a change from h-NPI(n) to any of the two other possible values can be written as h. NPI(mod(n+$\Delta_{hNPI}$, 3)) where $\Delta_{hNPI} \in \{1, 2\}$. Therefore, the number of hypotheses is reduced by 1 if $\Delta_{hNPI}$ is signaled instead of the absolute value of h. NPI (n).

Utilizing the above scheme, TABLE 6 describes an example embodiment for periodic PUCCH-based reporting mode 1-1 submode 2 where h-NPI is signaled jointly with RI in PUCCH Reporting Type 3 in Table 7.2.2-3 of TS36.213 [3]. The maximum recommended RI restricted to 2. To accommodate signaling the differential of h-RI, one additional bit is used.

TABLE 6

Joint encoding of RI with $\Delta$ for h-NPI, for PUCCH mode 1-1 submode 2

| Value of $I_{RI}$ | Hypothesis/recommendation |
| --- | --- |
| 0 | RI = 1 |
| 1 | RI = 2 |
| 2 | $\Delta_{hNPI}$ = 1 |
| 3 | $\Delta_{hNPI}$ = 2 |

When a hypothesis containing NPI or a feedback parameter associated with any one of the three methods mentioned above is reported (for example, a hypothesis taken from hypotheses 27 to 29 in TABLE 4, or hypotheses 12 to 14 in TABLE 5), or hypotheses 2 to 3 in TABLE 6, at least two example implementations exist pertaining to its companion CQI. A first example implementation is not to associate NPI recommendation with any CQI and/or PMI recommendation. In this case, the UE can either puncture any subsequent CQI and/or PMI reports until the next RI reporting instance, or report subsequent CQI and/or PMI reports assuming the most recent RI recommendation and most recent NPI configuration from the serving eNodeB. A second example implementation is to associate NPI recommendation with a certain predetermined RI and/or NPI hypothesis for CQI reporting. For example, when the UE reports an NPI hypothesis, the UE reports CQI and/or PMI conditioned upon transmission rank 1.

The above description of embodiments is especially suitable when the serving eNodeB transmits non-precoded CSI-RS (NP CSI-RS). That is, a cell-specific one-to-one mapping between CSI-RS port and TXRU (transceiver unit) is utilized. Here, different CSI-RS ports have the same wide beam width and direction and hence generally cell wide coverage. Another type of CSI-RS applicable to FD-MIMO is beamformed CSI-RS (BF CSI-RS). In this case, beamforming operation, either cell-specific or UE-specific, is applied on a non-zero-power (NZP) CSI-RS resource (including multiple ports). Here, at least at a given time/frequency CSI-RS ports have narrow beam widths and hence not cell wide coverage, and (at least from the eNB perspective) at least some CSI-RS port-resource combinations have different beam directions. This beamforming operation is intended to increase CSI-RS coverage or penetration. In addition, when UE-specific beamforming is applied to a CSI-RS resource (termed the UE-specific or UE-specifically beamformed CSI-RS), CSI-RS overhead reduction can be obtained when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNodeB, the UE can be configured to report PMI parameters associated with $W_2$ ($W_{2,1}$ and/or $W_{2,2}$) without $W_1$ ($W_{1,1}$ and/or $W_{1,2}$).

Each of the above CSI-RS configurations requires a different transmission strategy which potentially requires a different CSI reporting format for a configured CSI reporting mode. In addition to these factors, the 2D pattern of codebook mapped to CSI-RS ports also determines the CSI reporting format. In particular, a flexible configuration mechanism which allows a serving eNodeB to configure a UE with NP CSI-RS and UE-specific BF CSI-RS on a subframe basis is beneficial. This can improve system performance through CSI-RS overhead reduction, inter-cell interference reduction, and coverage improvement.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback can be utilized for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach can be termed the hybrid CSI-RS. The implementation of hybrid CSI-RS is largely dependent on the definition of CSI process and NZP CSI-RS resource.

Therefore, there is a need to design a CSI reporting framework which flexibly accommodates both NP and BF CSI-RS. In particular, the same framework (including a common codebook for PMI reporting) is utilized to operate both NP and BF CSI-RS based schemes.

Terms such as 'non-precoded' (or 'NP') CSI-RS and 'beamformed' (or 'BF') CSI-RS are used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially they are a first CSI-RS and a second CSI-RS. In another example, CSI-RS resource type can be used to differentiate those two modes of operation instead of CSI-RS type. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are example and can be substituted with other labels such as '1' and '2', or 'A' and 'B', or TYPE1 and TYPE2, or CLASS-A and CLASS-B. In another example, a MIMO type which can be associated with CSI reporting operation can be used to differentiate those two modes of operation instead of CSI-RS type. In this case, a UE is configured with a MIMO type associated with CSI reporting behaviors and, in addition, CSI measurement behaviors.

Referring to Equations 2 and 3 and given a precoding codebook (a set of precoding matrices W($i_{1,1}$, $i_{1,2}$, $i_{2,1}$, $i_{2,2}$) or W($i_{1,1}$, $i_{1,2}$, $i_2$)), a UE measures a CSI-RS in a subframe designated to carry CSI-RS, calculates/determines a CSI (including PMI, RI, and CQI where each of these three CSI parameters can include multiple components) based on the measurement, and reports the calculated CSI to a serving eNodeB. The measured CSI-RS can be one of the two types: non-precoded (NP) CSI-RS (or a first CSI-RS) and beamformed (BF) CSI-RS (or a second CSI-RS). In another example, the measured CSI-RS can be associated with one of the two MIMO types or CSI reporting behaviors. The UE can infer the type of CSI-RS in a given subframe from a higher-layer CSI-RS resource configuration information or CSI process configuration information.

The present disclosure also includes a use of a same precoding codebook or a same set of precoding codebooks (for example, a set including N codebooks for N different values of RI) for two types of CSI-RS measurements (associated with NP CSI-RS and BF CSI-RS; or a first CSI-RS and a second CSI-RS; or a first and a second MIMO types). In addition to using a common codebook or a common set of codebooks by a serving eNodeB and a UE, CSI calculation and reporting from the UE are performed differently depending on CSI-RS type or MIMO type.

For example, assuming full KP codebook in Equation 2, when the UE receives and measures NP CSI-RS (or a first CSI-RS or a first MIMO type) in a subframe, the UE calculates and reports the PMI components $\{i_{1,1}, i_{1,2}, i_{2,1}, i_{2,2}\}$ along with their associated CQI and RI. When the UE receives and measures BF CSI-RS (or a second CSI-RS or a second MIMO type) in a subframe, the UE calculates and reports only a part of the PMI components (for example, that which is associated with a second precoding stage: $i_{2,1}$ or $i_{2,2}$) along with their associated CQI and RI. For partial KP codebook in Equation 3, when the UE receives and measures NP CSI-RS (or a first CSI-RS or a first MIMO type) in a subframe, the UE calculates and reports the PMI components $\{i_{1,1}, i_{1,2}, i_2\}$ along with their associated CQI and RI. When the UE receives and measures BF CSI-RS (or a second CSI-RS or a second MIMO type) in a subframe, the UE calculates and reports only a part of the PMI components (for example, that which is associated with a second precoding stage: $i_2$) along with their associated CQI and RI.

This reduced PMI feedback is sufficient for the UE receiving BF CSI-RS if BF CSI-RS is designed to reduce the number of measured CSI-RS ports compared to that of NP CSI-RS. This reduction in the number of ports, from $N_{TX}=2M_aN_a$ to $N_b=2N_{b,1}N_{b,2}$, is performed by precoding or beamforming on CSI-RS ports in a UE-specific or UE-group-specific manner. Then, the serving eNodeB processes the reported CSI according to the type of CSI-RS received by the UE.

As discussed above, the UE can infer the type of CSI-RS to be received and measured in a given subframe from a higher-layer CSI-RS resource configuration information or CSI process configuration information. In another example, when an explicit second type of CSI-RS (or BF CSI-RS) is not defined, the UE behavior in measuring CSI-RS and sending CSI reports can be based on a MIMO type or a CSI reporting type (such as CLASS A and CLASS B) or mode which is signaled via higher-layer (RRC) as a part of CSI process or CSI-RS resource configuration. For example, the selector of UE behavior in CSI calculation and reporting is CSI-RS type in a first embodiment. In an alternative embodiment, the selector of UE behavior can be a MIMO type or a CSI reporting type/mode parameter which is signaled to the UE via higher-layer CSI process or CSI-RS resource configuration.

Figure 7:
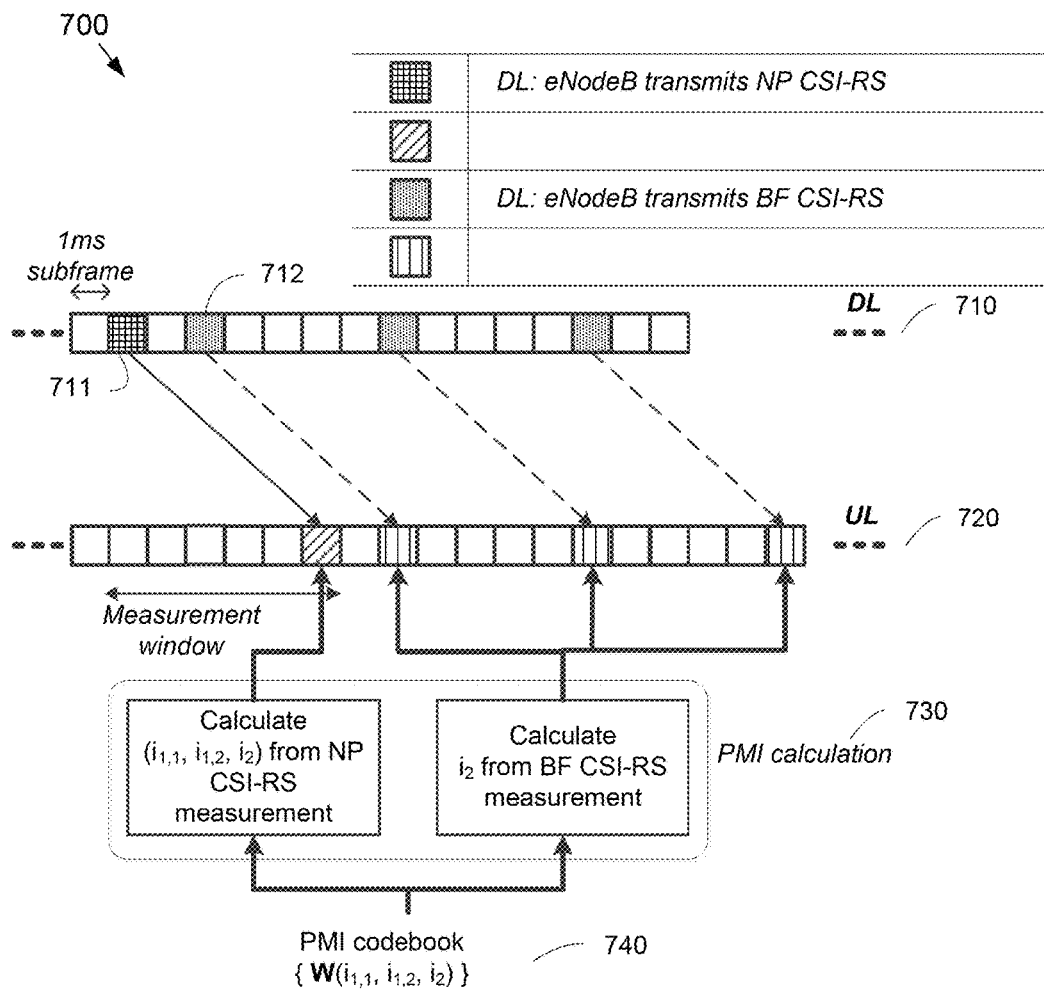
FIG. 7 illustrates an example DL/UL timing diagram for a UE configured for reporting CSI associated with a concurrent use of non-precoded and beamformed CSI-RS according to various embodiments of the present disclosure.

FIG. 7 illustrates an example DL-UL timing diagram 700 associated with the aforementioned UE behaviors using the partial KP codebook design. For illustrative purposes, CSI-RS type is used to differentiate the aforementioned two types of UE behaviors. Other means of differentiation such as MIMO type or CSI reporting behavior can be used as well. The depiction of diagram 700 is for illustrative purposes; other embodiments of the diagram 700 could be used without departing from the scope of the present disclosure.

In this illustrative example, a UE (e.g., one of UEs 111-116) receives a DL transmission 710 from a serving eNodeB (e.g., one of eNBs 101-103) where some of the DL subframes carry NP CSI-RS (such as 711) and some other DL subframes carry BF CSI-RS (such as 712). When the UE receives a DL subframe that carries one of those two types of CSI-RS (the type known from either CSI process or NZP CSI-RS resource configuration), the UE responds by measuring the CSI-RS and calculating a CSI corresponding to the type of CSI-RS. In this example embodiment, a PMI is calculated based on a common set of codebooks 740 (for instance, one codebook per RI value) for both types of CSI-RS. However, the set of calculated and reported PMI components differs for NP and BF CSI-RS (730). When the UE receives NP CSI-RS (which can be associated with a MIMO type or a particular UE behavior), the 3 PMI components $\{i_{1,1}, i_{1,2}, i_2\}$ corresponding to both stages and both dimensions are calculated and reported. When the UE receives BF CSI-RS, only one PMI component, such as the one corresponding to the second-stage precoding, is calculated and reported ($i_2$).

Depending on the configured CSI reporting mode, the calculated CSI can be reported in an uplink (UL) subframe allocated for CSI reporting. For example, for aperiodic CSI, the calculated CSI is reported at a subframe specified in relation to the DL subframe which contains the CSI request. For periodic CSI, the calculated CSI is reported at a subframe specified by subframe offset and periodicity of the configured periodic CSI reporting mode. For a DL subframe configured or associated with BF CSI-RS, having received and measured a CSI-RS including $N_{PORT,BF}$ ports (including two polarization groups), the UE calculates a recommended selection of 2v out of $N_{PORT,BF}$ ports (where v represents a recommended rank) and, if applicable, co-phasing between two polarization groups. This operation is associated with the second-stage precoding $W_2$ ($i_2$) for dual-polarized antenna port configurations.

The present disclosure also includes methods for configuring and multiplexing NP CSI-RS and UE-specific BF CSI-RS (or their associated configurations of MIMO type or CSI reporting behavior) for a given UE. At least three example implementations are provided by the present disclosure. In a first example implementation, a serving eNodeB configures two CSI processes for a UE, one for NP CSI-RS, another for BF CSI-RS. For each of the two CSI processes, a single NZP (non-zero-power) CSI-RS resource is configured. In a second example implementation, a serving eNodeB configures only one CSI processes for a UE. This single CSI process is utilized for both NP CSI-RS and BF CSI-RS. But within this single CSI process, two NZP CSI-RS resources are assigned, one for NP CSI-RS, another for BF CSI-RS. In a third example implementation, a serving eNodeB configures only one CSI process for a UE. This single CSI process is utilized for both NP CSI-RS and BF CSI-RS. Furthermore, only one NZP CSI-RS resource is used for both NP CSI-RS and BF CSI-RS.

For any of the above three example implementations, a serving eNodeB transmits CSI process and NZP CSI-RS resource configurations to a UE via higher-layer (RRC) signaling. Based on such configurations, the UE is able to identify or knows which subframes carry NP CSI-RS and which subframes carry BF CSI-RS (or their associated configurations of MIMO type or CSI reporting behavior). Based on this information, the UE responds accordingly when measuring CSI-RS, calculating CSI, and reporting CSI to the eNodeB as described in FIG. 7.

Moreover, for any of the above three alternatives, within one RRC configuration setup or update, a UE can be configured with a common CSI reporting mode (both periodic and aperiodic) in response to NP CSI-RS and BF CSI-RS. In another example, it is also possible to allow different CSI reporting modes (periodic or aperiodic) for NP CSI-RS and BF CSI-RS.

Figure 8A:
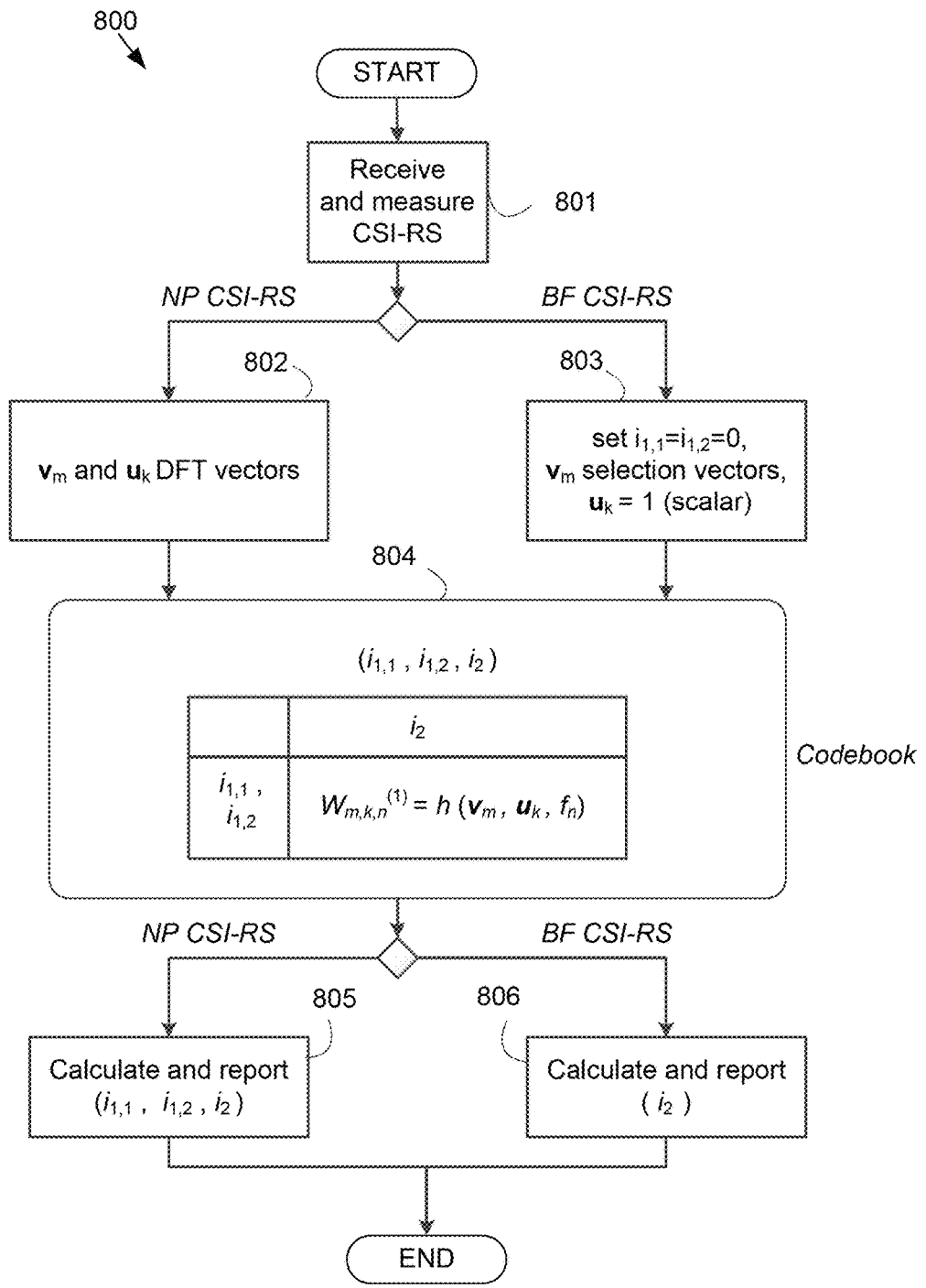
FIGS. 8A and 8B illustrate two example procedures for precoding matrix indicator calculations for a UE configured for reporting CSI associated with a concurrent use of non-precoded and beamformed CSI-RS according to various embodiments of the present disclosure.
Figure 8B:
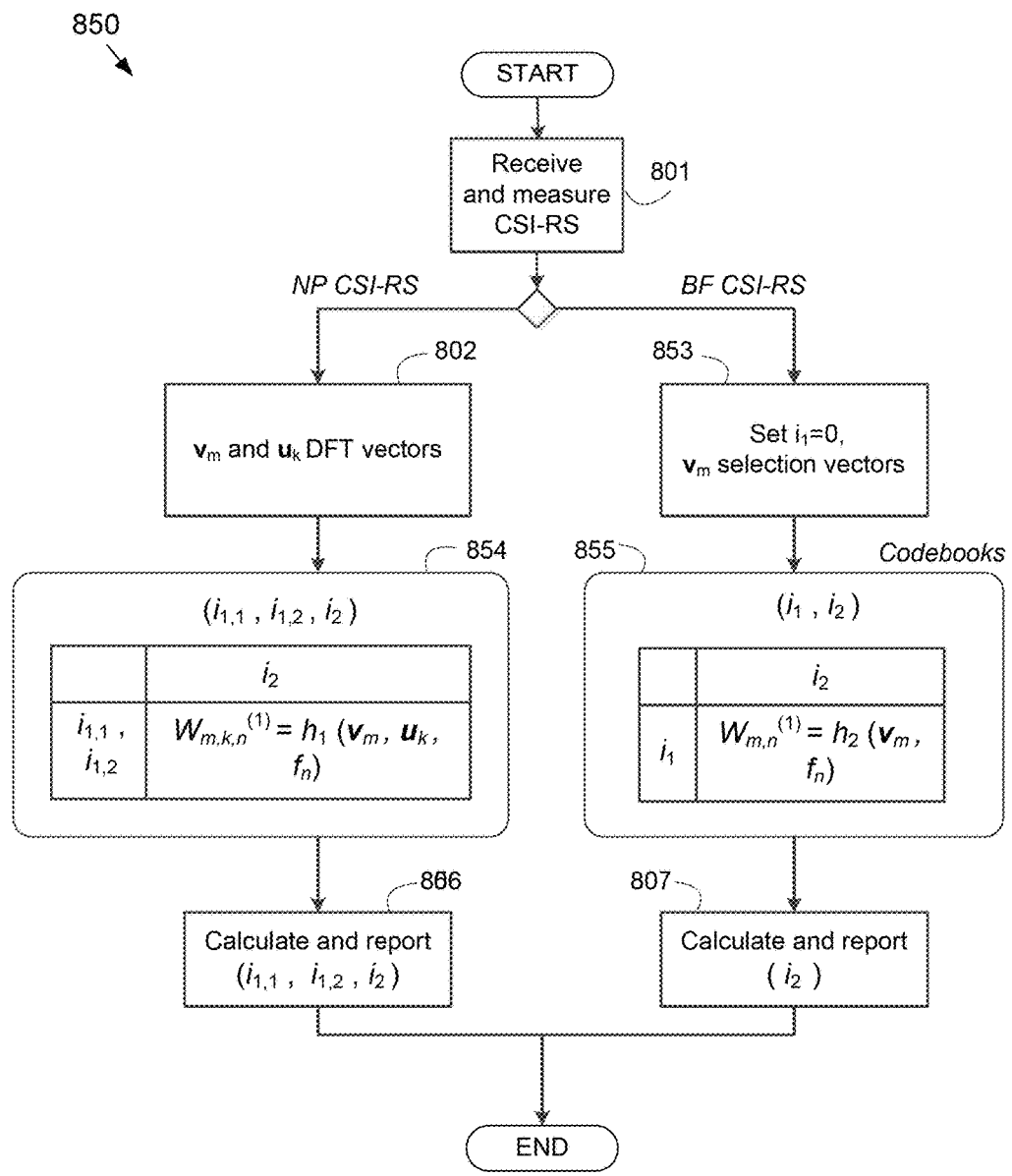

Two example embodiments are illustrated in FIGS. 8A and 8B. In example method 800 of FIG. 8A, a same codebook or a same set of codebooks 804 can be utilized for both NP CSI-RS and BF CSI-RS while PMI calculation and reporting are performed in response of the type of CSI-RS (or its associated configurations of MIMO type or CSI reporting behavior). The depiction of method 800 is for illustrative purposes; other embodiments of the method 800 could be used without departing from the scope of the present disclosure.

When a UE (e.g., one of UEs 111-116) receives and measures a CSI-RS (801), the UE infers the type of CSI-RS (or its associated configurations of MIMO type or CSI reporting behavior) from the UE's CSI process and/or CSI-RS resource configuration information. When it is determined that the CSI-RS is NP CSI-RS (or its associated configurations of MIMO type or CSI reporting behavior such as 'CLASS A'), the UE assumes a certain setting for codebook 804 as indicated in an example setting 802. Using this setup, the UE calculates and reports a CSI including three PMI components $\{i_{1,1}, i_{1,2}, i_2\}$ (805). Likewise, when it is determined that the CSI-RS is BF CSI-RS (or its associated configurations of MIMO type or CSI reporting behavior such as 'CLASS B'), the UE assumes a certain setting for codebook 804 as indicated in an example setting 803. Using this setup, the UE calculates and reports a CSI including only one PMI components $\{i_2\}$ (806).

Based on the codebook embodiments discussed above with regard to Equations 3-9, the settings in 802 are chosen in such a way that CSI calculation associated with NP CSI-RS (or its associated configurations of MIMO type or CSI reporting behavior such as 'CLASS A') uses the codebook embodiments discussed above with regard to Equations 3-9 as they are. That is, both the first and second stages are fully utilized. On the other hand, the settings in 803 are chosen in such a way that CSI calculation associated with BF CSI-RS (or its associated configurations of MIMO type or CSI reporting behavior such as 'CLASS B') uses only the second-stage components of the codebook embodiments discussed above with regard to Equations 3-9. This can be attained by setting $i_{1,1}, i_{1,2}=0$, $v_m$ as selection vectors (see e.g., Equation 8), and $u_k=1$.

One example of such codebook embodiments can also be devised from the rank-one (one-layer) codebook design described in Equations 10 and 11 in conjunction with TABLE 1 and TABLE 2. This codebook can be utilized for CSI calculation associated with both NP CI-RS and BF CSI-RS.

When a UE is configured to report a CSI associated with NP CSI-RS (or its associated configurations of MIMO type or CSI reporting behavior such as 'CLASS A'), the UE reports the CSI which includes three PMI values $i_{1,1}, i_{1,2}, i_2$. These three PMI values are calculated and/or reported assuming the aforementioned codebook when the last reported RI is one.

When the UE is configured to report a CSI associated with BF CSI-RS of $N_P$ ports (or its associated configurations of MIMO type or CSI reporting behavior such as 'CLASS B'), the UE reports the CSI which includes one PMI value $i_2$. This one PMI value is calculated and/or reported assuming the aforementioned codebook when the last reported RI is one, $i_{1,1}, i_{1,2}=0$, $v_m$ as length-$(N_P/2)$ selection vectors, and $u_k=1$. For this purpose, any one of the codebooks (CodebookGroup of 1 or 2) can be used. The codebook parameter CodebookGroup can be set to 2 as described in TABLE 2. When $N_P=2$, only the first 4 elements in TABLE 2 ($i_2=0, 1, 2, 3$) are used by the UE. When $N_P=4$, only the first 8 elements in TABLE 2 ($i_2=0, 1, 2, \ldots, 7$) are used by the UE. When $N_P=8$, all the 16 elements in TABLE 2 ($i_2=0, 1, 2, \ldots, 15$) are used by the UE.

A variation of method 800 is illustrated in method 850 of FIG. 8B where two different sets of codebooks are used for two types of CSI-RS (or its associated configurations of MIMO type or CSI reporting behavior). The depiction of method 850 is for illustrative purposes; other embodiments of the method 850 could be used without departing from the scope of the present disclosure.

In this illustrative embodiment, a one-dimensional dual-stage codebook 855, distinct from the 2D codebook 854 (such as the codebook embodiments discussed above with regard to Equations 3-9), is used when the measured CSI-RS is BF CSI-RS (or its associated configurations of MIMO type or CSI reporting behavior such as 'CLASS B'). The settings in 853 are chosen in such a way that CSI calculation associated with BF CSI-RS (or its associated configurations of MIMO type or CSI reporting behavior such as 'CLASS B') uses only the second-stage components of codebook 855. This can be attained by setting $i_1=0$ and $v_m$ as selection vectors (see e.g., Equation 8).

One example of such codebook embodiments can also be devised from the rank-one (one-layer) codebook design described in Equations 10 and 11 in conjunction with TABLE 1 and TABLE 2, as well as Table 7.2.4-1 of REF3. This codebook can be utilized for CSI calculation associated with only BF CSI-RS.

When a UE is configured to report a CSI associated with NP CSI-RS (or its associated configurations of MIMO type or CSI reporting behavior such as 'CLASS A'), the UE reports the CSI which includes three PMI values $i_{1,1}, i_{1,2}, i_2$. These three PMI values are calculated and/or reported assuming the first codebook design described in Equations 10 and 11 in conjunction with TABLE 1 and TABLE 2.

When the UE is configured to report a CSI associated with BF CSI-RS of $N_P$ ports (or its associated configurations of MIMO type or CSI reporting behavior such as 'CLASS B'), the UE reports the CSI which includes one PMI value $i_2$. This one PMI value is calculated and/or reported assuming the second codebook described in Table 7.2.4-1 of REF3 when the last reported RI is one, $i_1=0$, $v_m$ as length-$(N_P/2)$ selection vectors. When $N_P=2$, only the first 4 elements in Table 7.2.4-1 of REF3 ($i_2=0, 1, 2, 3$) are used by the UE. When $N_P=4$, only the first 8 elements in Table 7.2.4-1 of REF3 ($i_2=0, 1, 2, \ldots, 7$) are used by the UE. When $N_P=8$, all the 16 elements in Table 7.2.4-1 of REF3 ($i_2=0, 1, 2, \ldots, 15$) are used by the UE.

The CSI parameters that are reported for a given combination of CSI-RS type (or its associated configurations of MIMO type or CSI reporting behavior) and CSI reporting mode (defined in TS36.213 REF 3) are described in TABLE 7. For illustrative purposes, the partial KP codebook is assumed. Here, WB and SB denote wideband (one parameter calculated for the "set S subbands") and subband (one parameter per subband within the "set S subbands") reporting, respectively. M-SB denotes M UE-selected subbands. For the same CSI reporting mode, UE responds differently depending on the type of CSI-RS the UE measures in a given subframe. This assumes that the first and the second dimensions share the same frequency granularity (either WB, SB, or M-SB). In another example, for a given CSI reporting mode, the eNodeB can configure a UE with different PMI frequency granularities for the first and the second dimensions. For example, the PMI frequency granularity associated with the second dimension ($i_{1,2}$) follows that which is specified by the configured CSI reporting mode. The PMI frequency granularity associated with the first dimension ($i_{1,1}$) can be separately configured by an RRC (ASN. 1) parameter.

TABLE 7

CSI parameters for different types of CSI-RS and CSI reporting modes

| CSI-RS Type Measured | CSI reporting mode | RI | PMI $i_{1,1}, i_{1,2}$ | $i_2$ | CQI |
|---|---|---|---|---|---|
| NP CSI-RS | P-CSI 1-1-1 | Reported | WB | WB | WB |
| | P-CSI 1-1-2 | Reported | WB | WB | WB |
| | P-CSI 2-1 | Reported | WB | WB | WB, M-SB |
| | A-CSI 1-2 | Reported | WB | SB | WB |
| | A-CSI 2-2 | Reported | WB | M-SB | WB, M-SB |
| | A-CSI 3-1 | Reported | WB | WB | WB, SB |
| | A-CSI 3-2 | Reported | WB | SB | WB, SB |
| BF CSI-RS | P-CSI 1-1-1 | Reported | Not reported | WB | WB |
| | P-CSI 1-1-2 | Reported | Not reported | WB | WB |
| | P-CSI 2-1 | Reported | Not reported | WB | WB, M-SB |
| | A-CSI 1-2 | Reported | Not reported | SB | WB |
| | A-CSI 2-2 | Reported | Not reported | M-SB | WB, M-SB |
| | A-CSI 3-1 | Reported | Not reported | WB | WB, SB |
| | A-CSI 3-2 | Reported | Not reported | SB | WB, SB |

As discussed above, the UE can infer the type of CSI-RS to be received and measured in a given subframe from a higher-layer CSI-RS resource configuration message or CSI process configuration message. In another example, when an explicit second type of CSI-RS (or BF CSI-RS) is not defined, the UE behavior in measuring CSI-RS and sending CSI reports can be based on a MIMO type or a CSI reporting type or mode which is signaled via higher-layer (RRC) as a part of CSI process or CSI-RS resource configuration. For example, as described in FIGS. 8A and 8B as well as TABLE 7, the selector of UE behavior in CSI calculation and reporting is CSI-RS type. In various embodiments, the selector of UE behavior can be a MIMO type or a CSI reporting type or mode parameter which is signaled to the UE via higher-layer CSI process or CSI-RS resource configuration.

In regard of aperiodic CSI (A-CSI) reporting, it can be supported for both NP CSI-RS and BF CSI-RS (or their associated configurations of MIMO type or CSI reporting behavior). Within a CSI process configuration, A-CSI reporting configuration is done. For instance, A-CSI can be activated either for none of the two CSI-RS types, one of the two CSI-RS types, or both types of CSI-RS. For the first example implementation of CSI-RS multiplexing (where one CSI process is assigned to each of the two types of CSI-RS), a UE knows whether a triggered A-CSI reporting is associated with NP CSI-RS or BF CSI-RS from the corresponding CSI process. For the second or third alternative (where one CSI process is assigned for both types of CSI-RS), an indicator can be signaled to inform the UE of the associated type of CSI-RS (whether the type is NP CSI-RS or BF CSI-RS). At least two possibilities exist in this case.

A first possibility is to include a one-bit indicator in UL grant (for instance, DCI format 0 and/or 4) along with the one- or two-bit CSI request field. It can be supported as a separate DCI field or an expansion of the CSI request field.

A second possibility is to define a UE behavior without any additional field in UL grant. For example, the UE assumes that the type of CSI-RS associated with a triggered/requested CSI report is the type of the most recently received CSI-RS before and including the subframe carrying the CSI request. Another example, the UE assumes that the type of CSI-RS associated with a triggered/requested CSI report is the type of the first received CSI-RS after and including the subframe carrying the CSI request. Yet another example, the UE assumes that the type of CSI-RS associated with a triggered/requested CSI report is the type of the first received CSI-RS after and including the CSI reference resource. The details are given as follows.

The CSI reports corresponding to NP CSI-RS measurement and BF CSI-RS measurement can collide in the same subframe (same subframe configured for report transmission). In such cases, CSI reporting priority can be applied when such collision occurs, e.g. for PUCCH (periodic) reporting. It can be beneficial to prioritize the CSI reporting for one CSI-RS type over the other, e.g. NP CSI report can be prioritized over BF CSI-RS report if the network utilizes the NP CSI report to configure BF CSI-RS for the UE. Priority of NP CSI report is also beneficial when the NP CSI reporting periodicity can be significantly larger than the reporting periodicity for BF CSI, since dropping a NP CSI report can incur significant latency for the network to acquire NP CSI. There are several approaches in defining the CSI reporting priority handling which takes into account the CSI-RS type, when reporting collision occurs among CSI reports for the same serving cell and among CSI reports of multiple serving cells.

In a first approach, NP CSI report is prioritized over BF CSI-RS report regardless of reporting types. For example, in case of collision of a CSI report with NP CSI-RS of one serving cell with a CSI report with BF CSI-RS of the same serving cell the latter CSI report with BF CSI-RS has lower priority and is dropped. Further examples for collision handling for CSI reports of a same serving cell and for different serving cells are given below.

1) For a serving cell, in case of collision between CSI reports of same serving cell with CSI-RS type of the same priority, the priority handling or dropping rules as defined in Rel-12 can be followed.
2) If the UE is configured with more than one serving cell, the UE transmits a CSI report of only one serving cell in any given subframe. For a given subframe, in case of collision of a CSI report with BF CSI-RS of one serving cell with a CSI report with BF CSI-RS of another serving cell, the latter CSI with BF CSI-RS has lower priority and is dropped. For a given subframe, in case of collision between CSI reports of different serving cells with CSI-RS type of the same priority, the priority handling or dropping rules as defined in Rel-12 can be followed.
3) When only one type of CSI-RS can be configured per CSI process within one serving cell, at least two CSI processes can be configured for a UE with both types of CSI-RS. In this case, if collision among CSI reports associated the CSI process(es) configured with NP CSI-RS type and CSI reports associated the CSI process(es) configured with BF CSI-RS type (with one CSI-RS resource), the CSI reports corresponding to all CSI processes except the CSI processes with NP CSI-RS type are dropped.

CSI-RS type of NP and BF can also be termed 'nonPrecoded' and 'beamformed' MIMO types (eMIMO-Type). In another example, they can be differentiated in terms of CSI-Reporting-Type of 'CLASS A' and 'CLASS B'.

In a second approach, NP CSI report is prioritized over BF CSI-RS report in case of collision among reporting types of the same priority. For example, in case of collision between CSI reports of same serving cell with PUCCH reporting type of the same priority, and the CSI reports corresponding to CSI-RS type, the CSI reports corresponding to BF CSI-RS are dropped. Further examples for collision handling for CSI reports of a same serving cell and for different serving cells are given below.

1) For a serving cell, in case of collision between CSI reports of same serving cell with CSI-RS type of the same priority, the priority handling or dropping rules as defined in Rel-12 (when the PUCCH reporting types are of the same priority) can be followed.
2) If the UE is configured with more than one serving cell, the UE transmits a CSI report of only one serving cell in any given subframe. For a given subframe, in case of collision between CSI reports of these different serving cells with PUCCH reporting type of the same priority and the CSI reports corresponding to different CSI-RS types, the CSI with BF CSI-RS has lower priority and is dropped. For a given subframe, in case of collision between CSI reports of different serving cells with CSI-RS type of the same priority, the priority handling or dropping rules as defined in Rel-12 (when the PUCCH reporting types are of the same priority) can be followed.
3) When only one type of CSI-RS can be configured per CSI process within one serving cell, at least two CSI processes can be configured for a UE with both types of CSI-RS. In this case, if collision among reporting types of the same priority where CSI reports associated the CSI process(es) configured with NP CSI-RS type collide with CSI reports associated the CSI process(es) configured with BF CSI-RS type (with one CSI-RS resource), the CSI reports corresponding to all CSI processes except the CSI processes with NP CSI-RS type are dropped.

CSI-RS type of NP and BF can also be termed 'nonPrecoded' and 'beamformed' MIMO types (eMIMO-Type). In another example, they can be differentiated in terms of CSI-Reporting-Type of 'CLASS A' and 'CLASS B'.

In a third approach, NP CSI report is prioritized over BF CSI-RS report for all reporting types, except for certain reporting types combination. In one example, when reporting type for NP CSI-RS corresponds to CQI and the reporting type for BF CSI-RS corresponds to PTI/RI/PMI, in which case the latter report (PTI/RI/PMI of BF CSI) is prioritized and the CQI reporting type for NP CSI-RS is dropped. In another example, NP CSI report is prioritized over BF CSI-RS report for all reporting types, except when reporting type for NP CSI-RS corresponds to PMI/CQI and the reporting type for BF CSI-RS corresponds to PTI/RI, in which case the latter report (PTI/RI of BF CSI) is prioritized and the PMI/CQI reporting type for NP CSI-RS is dropped.

When multi-carrier operation is configured, priority rules between NP CSI and BF CSI can be considered if a (periodic) CSI report needs to be dropped. For example, CSI-RS type can take priority over CSI reporting type. Another example, CSI-RS type can be the tiebreaker when there are multiple CSI reports of same type (e.g. both are RI reports).

The UE can infer the type of CSI-RS to be received and measured in a given subframe from a higher-layer CSI-RS resource configuration message or CSI process configuration message. In another example, when an explicit second type of CSI-RS (or BF CSI-RS) is not defined, the UE behavior in measuring CSI-RS and sending CSI reports can be based on a CSI reporting type or mode which is signaled via higher-layer (RRC) as a part of CSI process or CSI-RS resource configuration. For example, the selector of UE behavior in CSI calculation and reporting is CSI-RS type in a first embodiment. In an alternative embodiment, the selector of UE behavior can be a CSI reporting type or mode parameter which is signaled to the UE via higher-layer CSI process or CSI-RS resource configuration.

As mentioned before, upon receiving CSI process and/or NZP CSI-RS resource configuration information, a UE can infer a CSI-RS type (or its associated MIMO type or CSI reporting type) in a given CSI-RS carrying subframe. The number of CSI-RS ports for NP CSI-RS (or its associated MIMO type or CSI reporting type such as 'nonPrecoded' or 'CLASS A') $N_{PORT,NP}$ tends to be larger than the number of CSI-RS ports for BF CSI-RS (or its associated MIMO type or CSI reporting type such as 'beamformed' or 'CLASS B') $N_{PORT,BF}$. In the current LTE specification, the set of port indices for NP CSI-RS is $\{15, 16, \ldots, 14+N_{PORT,NP}\}$. For BF CSI-RS, two options exist for the set of port indices. A first option is to follow the current LTE specification: $\{15, 16, \ldots, 14+N_{PORT,BF}\}$. A second option is to introduce flexibility in choosing any subset $\{Idx(0), Idx(1), \ldots, Idx(N_{PORT,BF}-1)\}$ of $\{15, 16, \ldots, 22\}$ or $\{15, 16, \ldots, 30\}$.

The UE can infer the type of CSI-RS to be received and measured in a given subframe from a higher-layer CSI-RS resource configuration message or CSI process configuration message. In another example, when an explicit second type of CSI-RS (or BF CSI-RS) is not defined, the UE behavior in measuring CSI-RS and sending CSI reports can be based on a MIMO type or a CSI reporting type or mode which is signaled via higher-layer (RRC) as a part of CSI process or CSI-RS resource configuration.

The present disclosure also includes utilizing the above CSI reporting embodiments for another type of CSI-RS, termed the cell-specific beamformed CSI-RS, where M beamformed CSI-RS beams (where this grid of beams is formed in a cell-specific manner) are transmitted and each of the M beams is associated with one CSI process or one NZP CSI-RS resource. This configuration requires a total of M CSI processes or M NZP CSI-RS resources. A UE configured with this GoB (grid-of-beams) setup reports a recommended beam selection (Ms out of M beams where $M_S<M$) after measuring the M CSI-RS beams associated with the M CSI processes or M NZP CSI-RS resources. In another example, a beam index (BI) can be defined as another CSI reporting parameter $i_3$. This type of CSI-RS can also be accommodated by utilizing a part of the second-stage codebook for beam selection feedback.

Each of the codebook designs described in the present disclosure can be a part of a larger codebook (e.g. master codebook) and obtained from applying codebook subset restriction to (choosing a subset of) the larger codebook. Likewise, codebook subset restriction can be applied to each of the codebook designs described in the present disclosure to generate a smaller codebook. In each of such cases, a remapping between PMI values ($\{i_{1,1}, i_{1,2}, i_{2,1}, i_{2,2}\}$ or $\{i_{1,1}, i_{1,2}, i_2\}$ or $\{i_1, i_2\}$) and codebook indices are required.

In one type of embodiment, the UE can infer the type of CSI-RS to be received and measured in a given subframe from a higher-layer CSI-RS resource configuration message or CSI process configuration message. In another example, when an explicit second type of CSI-RS (or BF CSI-RS) is not defined, the UE behavior in measuring CSI-RS and sending CSI reports can be based on a CSI reporting type or mode which is signaled via higher-layer (RRC) as a part of CSI process or CSI-RS resource configuration. For example, the selector of UE behavior in CSI calculation and reporting is CSI-RS type in a first embodiment. In another embodiment, the selector of UE behavior can be a CSI reporting type or mode parameter which is signaled to the UE via higher-layer CSI process or CSI-RS resource configuration.

The present disclosure also provides methods for codebook subset restriction (CSR) designed to perform at least one of three following functions. First, CSR is intended to limit UE search complexity by reducing the number of hypotheses in precoder searching. Second, reduction in the number of precoder hypotheses can be used to limit or reduce CSI feedback payload. This is especially relevant for periodic CSI reporting on PUCCH. Third, CSR is intended to select a codebook subset depending on DL long-term channel statistics.

An example CSR scheme can be constructed as follows. Choosing a subset of a first-stage codebook described discussed above with regard to Equations 4 or 5 allows a serving eNodeB to reduce the number of beams ($N_{b,1}$ for the first dimension, $N_{b,2}$ for the second dimension) in a first-stage precoding matrix. For example, for $N_{b,1}=2$, CSR can reduce the effective value of $N_{b,1}$ from 2 to 1. For $N_{b,2}=4$, CSR can reduce the effective value of $N_{b,2}$ from 4 to 2 or 1. When the effective value of $N_{b,1}$ or $N_{b,2}$ is reduced, the associated second-stage codebook is changed as given, for example, in Equation 8.

Several example embodiments of CSR for BF CSI-RS (or its associated configurations of 'beamformed' MIMO type or CSI reporting behavior such as 'CLASS B') are described hereafter.

A precoding vector or matrix is composed of beam selection and co-phasing across two polarization groups. A beam corresponds to a pair of ports of the same phase or direction but of different polarization groups. Therefore, for a given number of ports Np, the first $N_P/2$ rows of a precoding vector or matrix are associated with $N_P/2$ beams and a first polarization group. The second $N_P/2$ rows of a precoding vector or matrix are associated with $N_P/2$ beams and a second polarization group. The selection vector $e_m$ performs selection of the m-th out of $N_P/2$ beams.

Codebook subset restriction is signaled by a serving eNodeB to a UE via higher-layer (RRC) signaling/configuration.

One embodiment of codebook subset restriction comprises a bitmap (which is an RRC parameter) $b_{0,0}b_{0,1} \ldots b_{0,M_0-1}b_{1,0}b_{1,1} \ldots b_{1,M_1-1} \ldots b_{V-1,0}b_{V-1,1} \ldots b_{V-1,M_{V-1}}$ of length-$(\Sigma_{v=0}^{V-1}M_v)$ where $b_{v,m}$ is an indicator associated with the v-th layer and m-th precoding matrix/vector of layer/rank-v. Here, $b_{v,m}=0$ indicates that a UE should not select or recommend the m-th precoding matrix/vector of layer/rank-v to the eNodeB. That is, the (PMI,RI) combination associated with the m-th precoding matrix/vector of layer/rank-v is not selected and reported to the eNodeB (thereby excluded from the subset used for PMI reporting). Else, a UE selects or recommends only from a subset of precoding matrices/vectors where $b_{v,m}=1$. That is, the reported (PMI,RI) combination can only be associated with a precoding matrix/vector within such a subset. In this embodiment, subset restriction can be performed on the level of precoding matrix/vector and rank.

Another embodiment of codebook subset restriction performs subset restriction at the beam level across all ranks. This scheme comprises a bitmap $$b_0 b_1 \ldots b_{\frac{N_P}{2}-1}$$

of $$\text{length-}\left(\frac{N_P}{2}\right)$$

where $b_m$ is an indicator associated with the m-th out of $$\frac{N_P}{2}$$

beams. Here, $b_m=0$ implies that any precoding matrix/vector containing $e_m$ across all ranks is not selected and reported to the eNodeB (thereby excluded from the subset used for PMI reporting). Else, a UE selects or recommends only from a subset of precoding matrices/vectors where $b_m=1$ (that is, a subset of all precoding matrices/vectors containing $e_m$ across all ranks).

Another embodiment of codebook subset restriction performs subset restriction at the rank level. This scheme comprises a bitmap $b_0 b_1 \ldots b_{V-1}$ of length-(V) where $b_m$ is an indicator associated with the m-th out of V rank values (here V is the maximum rank supported by the $N_P$-port codebook, where $V \leq N_P$). For instance, for $N_P=4$ and $V=N_P$, $b_0 b_1 b_2 b_3 = 1100$ implies that rank-3 and 4 are excluded from PMI/RI calculation and selection. That is, only precoding matrices/vectors associated with rank-1 and 2 can be selected and recommended by the UE.

Another embodiment of codebook subset restriction combines the second and the third embodiments. This scheme comprises a bitmap (which is an RRC parameter)

$$b_{0,0}b_{0,1} \ldots b_{0,\frac{N_P}{2}-1} b_{1,0}b_{1,1} \ldots b_{1,\frac{N_P}{2}-1} \ldots \ldots b_{V-1,0}b_{V-1,1} \ldots b_{V-1,\frac{N_P}{2}-1}$$

of $$\text{length-}\frac{VN_P}{2}$$

where $b_{v,m}$ is an indicator associated with the v-th layer and m-th beam. Here, $b_{v,m}=0$ indicates that a UE should not select or recommend the precoding matrix/vector of layer/rank-v associated with the m-th beam (that is, containing $e_m$) to the eNodeB. That is, the (PMI,RI) combination associated with the m-th beam of layer/rank-v is not selected and reported to the eNodeB (thereby excluded from the subset used for PMI reporting). Else, a UE selects or recommends only from a subset of precoding matrices/vectors where $b_{v,m}=1$ (that is, containing em). That is, the reported (PMI, RI) combination can only be associated with a precoding matrix/vector within such a subset.

A yet another embodiment of codebook subset restriction is applicable to cell-specific BF CSI-RS (or CSI reporting class B with K>1) where beam selection is performed. This scheme comprises a bitmap $b_0 b_1 \ldots b_{K-1}$ of length-(K) where $b_m$ is an indicator associated with the m-th out of K beams or CSI-RS resources. Here, $b_m=0$ indicates that a UE should not select or recommend the m-th beam or CSI-RS resource to the eNodeB. Else, a UE selects or recommends only from a subset of precoding matrices/vectors where $b_m=1$ (that is, the m-th beam or CSI-RS resource).

Figure 9:
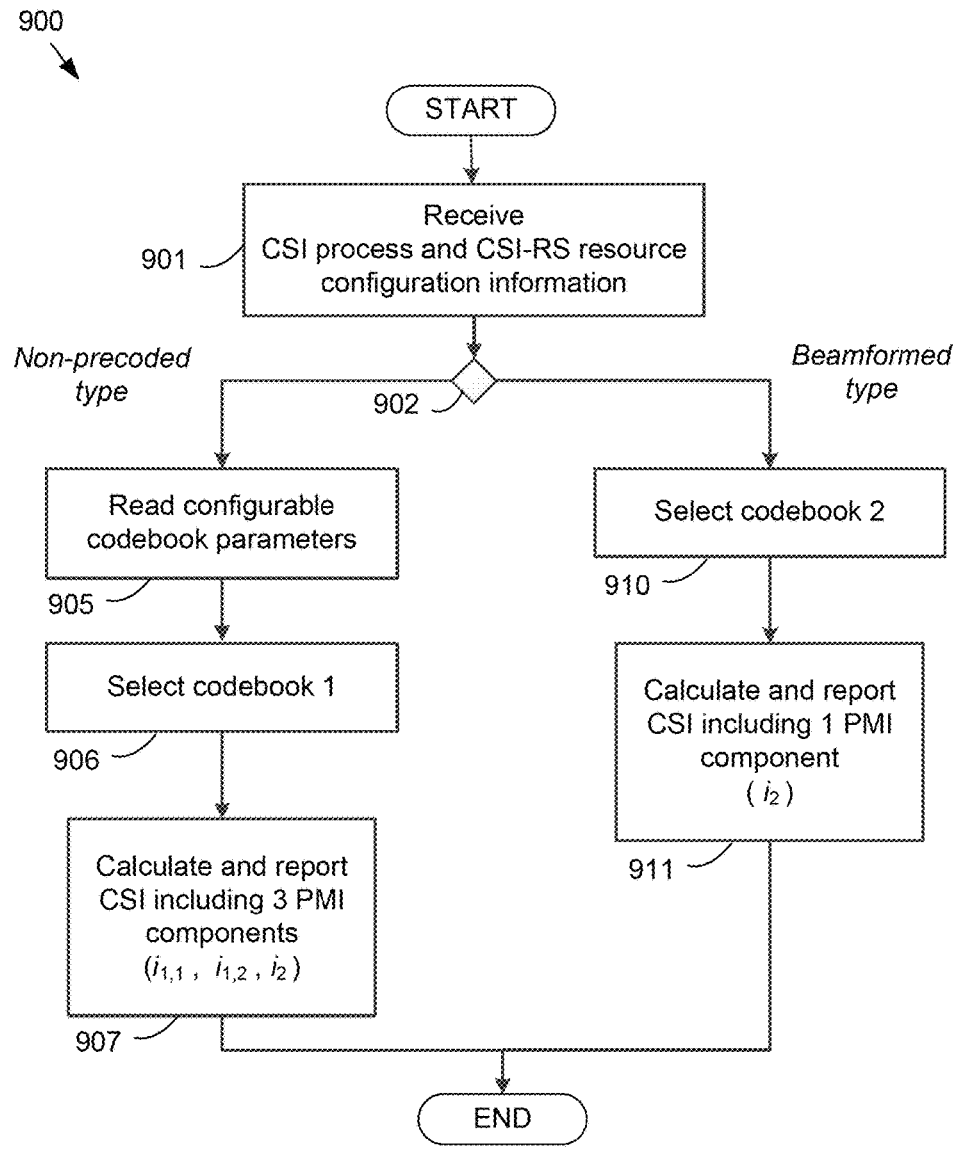
FIG. 9 illustrates an example method wherein a UE is configured to measure CSI-RS and report CSI.

FIG. 9 illustrates an example method 900 wherein a UE is configured to measure CSI-RS and report CSI. The depiction of method 900 is for illustrative purposes; other embodiments of the method 900 could be used without departing from the scope of the present disclosure. The UE (e.g., one of UEs 111-116) receives CSI process and CSI-RS resource configuration information in 901 including a CSI-RS type or a MIMO type configuration (902). If the UE is configured with a non-precoded type, the UE determines the values of codebook parameters carried in the configuration information (905). The codebook selected at 906, used for CSI calculation, is configured by the values of codebook parameters. The codebook parameters can include the number of ports and oversampling factors for a first and a second dimension, and a codebook selection parameter. The UE reports CSI which includes three PMI components $\{i_{1,1}, i_{1,2}, i_2\}$ (907). If the UE is configured with a beamformed type, the UE chooses a codebook different from that used for the non-precoded type. This second codebook 910 can either be an independent codebook altogether, or derived from a part of the first codebook (such as the second-stage of the first codebook), or derived from a part of a third codebook. The UE reports CSI which includes only one PMI component $\{i_2\}$ (911). This single PMI component is not necessarily the same as the third PMI component associated with the non-precoded type.

Figure 10:
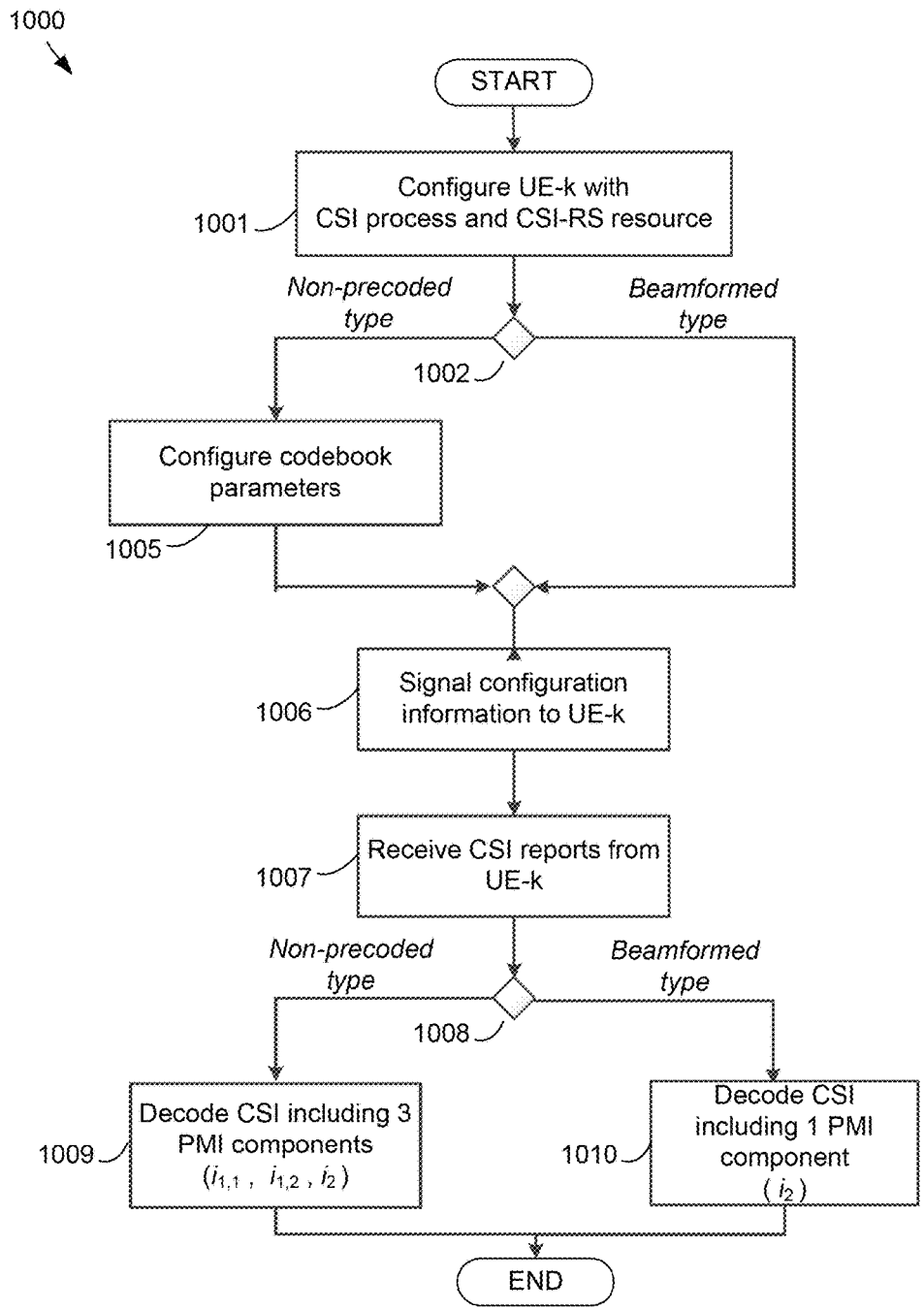
FIG. 10 illustrates an example method wherein an eNB configures a UE (labeled UE-k) with a CSI process and the CIS process's associated CSI-RS resource.

FIG. 10 illustrates an example method 1000 wherein an eNB configures a UE (labeled UE-k) with a CSI process and the CIS process's associated CSI-RS resource (1001). The depiction of method 1000 is for illustrative purposes; other embodiments of the method 1000 could be used without departing from the scope of the present disclosure. The eNB (e.g., one of eNBs 101-103) decides or configures a CSI-RS type or a MIMO type for the UE (1002). If the UE is configured with a non-precoded type, codebook parameters are also included in the configuration information (1005). The CSI-RS type or MIMO type, along with the codebook parameters if applicable, are included in the configuration information and signaled to the UE (1006). The codebook parameters can include the number of ports and oversampling factors for a first and a second dimension, and a codebook selection parameter. Upon receiving CSI reports from the UE (1007), depending on whether the UE is configured a non-precoded type or a beamformed type (1008), the UE decodes CSI which includes 3 PMI components $\{i_{1,1}, i_{1,2}, i_2\}$ (1009) or 1 PMI component $\{i_2\}$ (1010), respectively.

The above configuration information is signaled to the UE via higher-layer or RRC signaling. At least one of the codebook parameters can also be signaled to the UE via higher-layer or RRC signaling. In another example, signaling via a DL control channel can be used at least for one of the codebook parameters.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE), comprising:
   a transceiver configured to:
      receive, from a base station (BS), configuration information for a channel state information (CSI) process;
      receive, from the BS, configuration information for a CSI reference signal (CSI-RS) resource;
      receive, from the BS, configuration information for a multiple-input multiple-output (MIMO) type, wherein the MIMO type is associated with a CSI reporting operation; and
      receive a plurality of codebook parameters when the MIMO type is non-precoded; and
   a processor operably connected to the transceiver, the processor configured to:
      measure the CSI-RS resource; and
      generate, using a codebook determined based on the MIMO type, a CSI report based on the measured CSI-RS resource,
   wherein the transceiver is further configured to transmit the CSI report to the BS,
   wherein the codebook parameters include (i) a number of ports and oversampling factors for a first dimension and a second dimension and (ii) a codebook selection parameter,
   wherein when the MIMO type is non-precoded, the codebook used to generate the CSI report is a first codebook derived from the codebook parameters, and the processor is configured to generate the CSI report using the first codebook, and
   wherein when the MIMO type is beamformed, the codebook used to generate the CSI report is a second codebook different than the first codebook, and the processor is configured to generate the CSI report using the second codebook.

2. The UE of claim 1, wherein the number of ports is 4 or 8 and the oversampling factor(s) is one of 2-time oversampling, 4-time oversampling, or a mixture of 2-time oversampling, 4-time oversampling.

3. The UE of claim 1, wherein each of the configuration information is transmitted via radio resource controller (RRC) signaling.

4. The UE of claim 1, wherein the codebook selection parameter corresponds to a number of discrete Fourier transform (DFT) vectors in each of the first and second dimensions and at least one of the oversampling factors is configurable to be either 4 or 8.

5. The UE of claim 1, wherein the transceiver is configured to transmit the CSI report including (i) three precoding matrix indicator components when the MIMO type is non-precoded or (ii) one precoding matrix indicator component when the MIMO type is beamformed.

6. A base station (BS), comprising:
   a processor configured to:
      configure a user equipment (UE) with a channel state information (CSI) process and a CSI reference signal (CSI-RS) resource; and
      configure the UE with a multiple-input multiple-output (MIMO) type; and
   a transceiver operably connected to the processor, the transceiver configured to:
      transmit configuration information for the CSI process, the CSI-RS resource, and the MIMO type to the UE; and receive, from the UE, a CSI report generated based on the CSI-RS resource, the CSI report generated using a codebook determined based on the MIMO type, wherein the MIMO type is associated with a CSI reporting operation, and wherein the UE is configured with a plurality of codebook parameters when the MIMO type is non-precoded, wherein the codebook parameters include (i) a number of ports and oversampling factors for a first and a second dimension and (ii) a codebook selection parameter, wherein the codebook used to generate the CSI report is a first codebook derived from the codebook parameters and the CSI report is generated using the first codebook when the MIMO type is non-precoded, and wherein the codebook used to generate the CSI report is a second codebook different than the first codebook and the CSI report is generated using the second codebook when the MIMO type is beamformed.

7. The BS of claim 6, wherein the number of ports is 4 or 8 and the oversampling factor(s) is one of 2-time oversampling, 4-time oversampling, or a mixture of 2-time oversampling, 4-time oversampling for a first and a second dimension and (ii) a codebook selection parameter.

8. The BS of claim 6, wherein the configuration information is transmitted via radio resource controller (RRC) signaling.

9. The BS of claim 6, wherein the codebook selection parameter corresponds to a number of discrete Fourier transform (DFT) vectors in each of the first and second dimensions and at least one of the oversampling factors is configurable to be either 4 or 8.

10. The BS of claim 6, the transceiver is configured to receive the CSI report from the UE that includes (i) three precoding matrix indicator components when the MIMO type is non-precoded or (ii) one precoding matrix indicator component when the MIMO type is beamformed.

11. A method for operating a user equipment (UE), the method comprising:
receiving, by the UE, configuration information for a channel state information (CSI) process from a base station (BS);
receiving, by the UE, configuration information for a CSI reference signal (CSI-RS) resource from the BS;
receiving, by the UE, configuration information for a multiple-input multiple-output (MIMO) type from the BS, wherein the MIMO type is associated with a CSI reporting operation;
receiving, by the UE, a plurality of codebook parameters when the MIMO type is non-precoded;
measuring, by the UE, the CSI-RS resource;
generating, by the UE, using a codebook determined based on the MIMO type, a CSI report based on the measured CSI-RS resource; and
transmitting, by the UE, the CSI report to the BS,
wherein the codebook parameters include (i) a number of ports and oversampling factors for a first and a second dimension and (ii) a codebook selection parameter,
wherein, when the MIMO type is non-precoded, the codebook used to generate the CSI report is a first codebook derived from the codebook parameters and generating the CSI report comprises generating the CSI report using the first codebook, and
wherein, when the MIMO type is beamformed, the codebook used to generate the CSI report is a second codebook different than the first codebook and generating the CSI report comprises generating the CSI report using the second codebook.

12. The method of claim 11, wherein the number of ports is 4 or 8 and the oversampling factor(s) is one of 2-time oversampling, 4-time oversampling, or a mixture of 2-time oversampling, 4-time oversampling.

13. The method of claim 11, wherein the configuration information is transmitted via radio resource controller (RRC) signaling.

14. The method of claim 11, wherein the codebook selection parameter corresponds to a number of discrete Fourier transform (DFT) vectors in each of the first and second dimensions and at least one of the oversampling factors is configurable to be either 4 or 8.

15. The method of claim 11, wherein transmitting the CSI report comprises transmitting the CSI report including (i) three precoding matrix indicator components when the MIMO type is non-precoded or (ii) one precoding matrix indicator component when the MIMO type is beamformed.

* * * * *